(12) United States Patent
Vemury et al.

(10) Patent No.: US 12,067,750 B2
(45) Date of Patent: Aug. 20, 2024

(54) METHODS AND SYSTEMS FOR ESTABLISHING ACCURATE PHENOTYPE METRICS

(71) Applicant: The Government of the United States of America, as represented by the Secretary of Homeland Security, Washington, DC (US)

(72) Inventors: Arun Vemury, North Bethesda, MD (US); Yevgeniy Sirotin, Severna Park, MD (US); John Howard, Bethesda, MD (US); Jerry Tipton, Severn, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/381,840

(22) Filed: Oct. 19, 2023

(65) Prior Publication Data
US 2024/0144535 A1  May 2, 2024

Related U.S. Application Data

(60) Provisional application No. 63/419,980, filed on Oct. 27, 2022.

(51) Int. Cl.
*G06T 7/90* (2017.01)
*G06T 7/80* (2017.01)

(52) U.S. Cl.
CPC ............... *G06T 7/90* (2017.01); *G06T 7/80* (2017.01); *G06T 2207/10024* (2013.01); *G06T 2207/30201* (2013.01)

(58) Field of Classification Search
CPC ... G06T 7/90; G06T 7/80; G06T 2207/10024; G06T 2207/30201
See application file for complete search history.

(56) References Cited

U.S. PATENT DOCUMENTS 6,157,445 A * 12/2000 Macfarlane ............... G01J 3/50
356/243.5
6,437,863 B1 * 8/2002 Macfarlane .......... A61B 5/1032
356/243.5
(Continued)

FOREIGN PATENT DOCUMENTS

WO  2019112650 A1  6/2019
WO  2022201411 A1  9/2022

OTHER PUBLICATIONS

Pantaone, Create Custom Reference Data for ColorChecker SG and 24, https://www.xrite.com/-/media/xrite/files/apps_engineering_techdocuments/c/custom_reference_data_en.pdf, Mar. 2015 (Year: 2015).*

(Continued)

*Primary Examiner* — Andrae S Allison
(74) *Attorney, Agent, or Firm* — Lavanya Ratnam; Robert W. Busby

(57) ABSTRACT

Systems and methods for measuring skin tone. A camera and computer may measure skin tone health of a face dataset and color quality of a single face image. The computer and camera may measure skin tone across wide sample of volunteers, express skin tone in CIELCH coordinates; and identify the range of observed lightness, chromaticity, and hue values in the population to determine a sample set. The computer and camera may be configured to match the image to a coordinate system of lightness, chromaticity, and hue in the sample set. If a match is not possible, the computer may (Continued)

be configured to select a coordinate closest to the measured lightness, chromaticity, and hue.

**20 Claims, 40 Drawing Sheets
(30 of 40 Drawing Sheet(s) Filed in Color)**

(56) References Cited

U.S. PATENT DOCUMENTS

| | | | |
|---|---|---|---|
| 9,325,707 | B2 | 4/2016 | Ketchantang |
| 9,900,147 | B2 | 2/2018 | Laine et al. |
| 9,904,840 | B2 | 2/2018 | Zhang et al. |
| 11,277,258 | B1 | 3/2022 | Zhang et al. |
| 11,451,394 | B2 | 9/2022 | Arora et al. |
| 11,496,288 | B1 | 11/2022 | Soltani et al. |
| 2006/0112278 | A1 | 5/2006 | Cohen et al. |
| 2007/0055889 | A1 | 3/2007 | Henneberry et al. |
| 2008/0097851 | A1 | 4/2008 | Bemmel et al. |
| 2009/0113209 | A1* | 4/2009 | Lee ............ G06F 21/32 713/186 |
| 2013/0035979 | A1 | 2/2013 | Tenbrock |
| 2013/0148868 | A1 | 6/2013 | Troncoso Pastoriza et al. |
| 2015/0046990 | A1 | 2/2015 | Oberheide et al. |
| 2015/0186634 | A1 | 7/2015 | Crandell et al. |
| 2016/0103984 | A1 | 4/2016 | Warrier |
| 2016/0204936 | A1 | 7/2016 | Sakemi et al. |
| 2018/0053005 | A1 | 2/2018 | Kamal |
| 2019/0044697 | A1 | 2/2019 | Paz de Araujo et al. |
| 2019/0121951 | A1 | 4/2019 | Nassi et al. |
| 2019/0278895 | A1 | 9/2019 | Streit |
| 2019/0278937 | A1 | 9/2019 | Streit |
| 2019/0280869 | A1 | 9/2019 | Streit |
| 2019/0327227 | A1* | 10/2019 | Tobkes ............ H04L 67/52 |
| 2019/0370688 | A1 | 12/2019 | Patel |
| 2020/0044852 | A1 | 2/2020 | Streit |
| 2020/0136818 | A1 | 4/2020 | Jiang et al. |
| 2020/0228339 | A1 | 7/2020 | Barham et al. |
| 2020/0228341 | A1 | 7/2020 | Mohassel et al. |
| 2020/0259638 | A1 | 8/2020 | Carmignani et al. |
| 2020/0259896 | A1 | 8/2020 | Sachs et al. |
| 2020/0358611 | A1 | 11/2020 | Hoang |
| 2021/0124815 | A1 | 4/2021 | Rindal |
| 2021/0211290 | A1* | 7/2021 | Jindal ............ H04L 9/008 |
| 2021/0211291 | A1 | 7/2021 | Jindal et al. |
| 2021/0344477 | A1 | 11/2021 | Aharoni et al. |
| 2021/0350174 | A1* | 11/2021 | Merkle ............ G06T 5/92 |
| 2021/0377031 | A1 | 12/2021 | Aharoni et al. |
| 2022/0085971 | A1 | 3/2022 | Zhang et al. |
| 2022/0103362 | A1* | 3/2022 | Chafni ............ G06V 40/166 |
| 2022/0109574 | A1 | 4/2022 | Narumanchi et al. |
| 2022/0131698 | A1 | 4/2022 | Badrinarayanan et al. |
| 2022/0277064 | A1 | 9/2022 | Streit |
| 2022/0300593 | A1 | 9/2022 | Brownlee |
| 2022/0321348 | A1 | 10/2022 | Isshiki |
| 2022/0322083 | A1 | 10/2022 | Kreishan et al. |
| 2023/0011633 | A1 | 1/2023 | Waldron et al. |
| 2023/0033479 | A1 | 2/2023 | Despiegel et al. |

OTHER PUBLICATIONS

Yang, Boquan, et al. "Facial skin color measurement based on camera colorimetric characterization." Holography, Diffractive Optics, and Applications VII. vol. 10022. SPIE, 2016. (Year: 2016).*

Howard, John J., et al. "Reliability and validity of image-based and self-reported skin phenotype metrics." IEEE Transactions on Biometrics, Behavior, and Identity Science 3.4 (2021): 550-560. (Year: 2021).*

Zeng, Huanzhao, and M. Luo. "Skin color modeling of digital photographic images." Journal of Imaging Science and Technology 55.3 (2011): 30201-1. (Year: 2011).*

Serrano, C., B. Acha, and S. J. Sangwine. "Colorimetric calibration of images of human skin captured under hospital conditions." AIC Colour'05, 10th Congress of the International Colour Association. 2005. (Year: 2005).*

Otto, Nate et al., Verifiable Credentials Use Cases, W3C Working Group Note Sep. 24, 2019, https://www.w3.org/TR/2019/NOTE-vc-use-cases-20190924.

Buolamwini, Joy et al., Gender Shades: Intersectional Accuracy Disparities in Commercial Gender Classification, Proceedings of Machine Learning Research, 81, pp. 1-15, 2018.

Gentry, Craig et al., "Homomorphic Encryption from Learning with Errors: Conceptually-Simpler, Asymptotically-Faster, Attribute-Based", Jun. 8, 2013.

Rivest, Ronald et al., On Data Banks and Privacy Homomorphisms, Massachusetts Institute of Technology, Cambridge, Massachusetts, 1978.

Paillier, Pascal, "Public-Key Cryptosystems Based on Composite Degree Residuosity Classes", Springer-Verlag Berlin Heidelberg, Eurocrypt'99, LNCS 1592, pp. 223-238, 1999.

Sing, Harmeet, Public-Key Cryptosystem Based on Composite Degree Residuosity Classes aka Paillier Cryptosystem, Winter 2018.

Chillotti, Ilaria et al., "TFHE: Fast Fully Homomorphic Encryption over the Torus", Journal of Cryptology 33, published Apr. 25, 2019.

Boddeti, Vishnu Naresh, "Secure Face Matching Using Fully Homomorphic Encryption" Michigan State University, East Lansing, MI, Jul. 2018.

Liu, Qingshan, et al. "Occlusion Robust Face Recognition with Dynamic Similarity Features", 18th International Conference on Pattern Recognition (ICPR' 2006) 0-7695-2521-0/06, IEEE.

Nguyen, Hieu V. and Li Bai, "Cosine Similarity Metric Learning for Face Verification", DOI: 10.1007/978-3-642-19309-5_55, source: DBLP Nov. 2010, https://www.researchgate.net/publication/220745463.

Remani, Naga et al., "Similarity of Inference Face Matching on Angle Oriented Face Recognition", Journal of Information Engineering and Applications, ISSN 2224-5758 (print), ISSN 2224-896X (online). vol. 1, No. 1, 2011.

Ahdid, Rachid et al., "Euclidean & Geodesic Distance between a Facial Feature Points in Two-Dimensional Face Recognition System", International Journal of Neural Networks and Advanced Applications, vol. 4, 2017.

Boneh, Dan et al., "Evaluating 2-DNF Formulas on Ciphertexts" Apr. 2, 2006.

Vytautas Perlibakas, "Distance measures for PCA-based face recognition", Pattern Recognition Letters vol. 25 (2004), pp. 711-724.

Eugenio A. Silva, "Practical use of Partially Homomorphic Cryptography", 2016.

P. Jonathon Phillips, "Support Vector Machines Applied to Face Recognition", Advances in Neural Information Processing Systems 11, technical report NISTIR 6241, 1999.

Sadeghi, Ahmad-Reza, et al., "Efficient Privacy-Preserving Face Recognition", ICISC, 2009.

TSA Biometrics Roadmap for Aviation Security & the Passenger Experience, Sep. 2018.

Chibba, Michelle, et al., "On Uniqueness of Facial Recognition Templates", NTIA US Department of Commerce, Privacy Multistakeholder Process: Facial Recognition Technology, Mar. 2014.

Lagendijk, R.L. et al., "Encrypted signal processing for privacy protection: Conveying the utility of homomorphic encryption and multiparty computation," in IEEE Signal Processing Magazine, vol. 30, No. 1, pp. 82-105, Jan. 2013, doi: 10.1109/MSP.2012.2219653 (Year: 2013).

Marta Gomez-Barrero, et al., Multi-biometric template protection based on Homomorphic Encryption, Pattern Recognition, vol. 67, pp. 149-163. https://www.sciencedirect.com/science/article/pii/S0031320317300249 (Year: 2017).

* cited by examiner

Facial Skin Tone - MdTF Sample

DSM III Colorimeter
Cortex Technology

One reading each from the left and the right temple.
Average value computed.

1,000+ unique volunteers.
Diverse race, gender, age.
2,000+ color samples.

METHODS AND SYSTEMS FOR ESTABLISHING ACCURATE PHENOTYPE METRICS

CROSS-REFERENCE

This application claims the benefit of priority U.S. Provisional Application No. 63/419,980 filed Oct. 27, 2022, the contents of which are incorporated by references in their entirety.

STATEMENT OF GOVERNMENT INTEREST

The present invention was made by employees of the United States Department of Homeland Security in the performance of their official duties.

FIELD

The present disclosure relates systems and method for determining phenotype metrics and skin tone through computer vision.

BACKGROUND

[1] H. Suresh and J. V. Guttag, "A framework for understanding sources of harm throughout the machine learning life cycle," 2019, arXiv:1901.10002.

[2] J. J. Howard, Y. B. Sirotin, and A. R. Vemury, "The effect of broad and specific demographic homogeneity on the imposter distributions and false match rates in face recognition algorithm performance," in Proc. 10th IEEE Int. Conf Biometrics Theory Appl. Syst. (BTAS), 2019, pp. 1-8.

[3] K. S. Krishnapriya, K. Vangara, M. C. King, V. Albiero, and K. Bowyer, "Characterizing the variability in face recognition accuracy relative to race," in Proc. IEEE Conf. Comput. Vis. Pattern Recognit. Workshops, 2019, pp. 2278-2285.

[4] P. Grother, M. Ngan, and K. Hanaoka, "Face recognition vendor test (FRVT) Part 3: Demographic effects," NIST, Gaithersburg, MD, USA, Rep. NISTIR 8280, 2019.

[5] D. S. Ma, K. Koltai, R. M. McManus, A. Bernhardt, J. Correll, and B. Wittenbrink, "Race signaling features: Identifying markers of racial prototypicality among Asians, Blacks, Latinos, and Whites," Soc. Cognit., vol. 36, no. 6, pp. 603-625, 2018.

[6] C. M. Cook, J. J. Howard, Y. B. Sirotin, J. L. Tipton, and A. R. Vemury, "Demographic effects in facial recognition and their dependence on image acquisition: An evaluation of eleven commercial systems," IEEE Trans. Biometrics, Behav., Identity Sci., vol. 1, no. 1, pp. 32-41, January 2019.

[7] J. Buolamwini and T. Gebru, "Gender shades: Intersectional accuracy disparities in commercial gender classification," in Proc. Conf. Fairness Accountability Transparency, 2018, pp. 77-91.

[8] V. Muthukumar et al., "Understanding unequal gender classification accuracy from face images," 2018, arXiv: 1812.00099.

[9] K. S. Krishnapriya, V. Albiero, K. Vangara, M. C. King, and K. W. Bowyer, "Issues related to face recognition accuracy varying based on race and skin tone," IEEE Trans. Technol. Soc., vol. 1, no. 1, pp. 8-20, March 2020.

[10] B. Lu, J.-C. Chen, C. D. Castillo, and R. Chellappa, "An experimental evaluation of covariates effects on unconstrained face verification," IEEE Trans. Biometrics, Behav. Identity Sci., vol. 1, no. 1, pp. 42-55, January 2019.

[11] B. Wilson, J. Hoffman, and J. Morgenstern, "Predictive inequity in object detection," 2019, arXiv:1902.11097.

[12] M. Mitchell et al., "Model cards for model reporting," in Proc. Conf. Fairness Accountability Transparency, 2019, pp. 220-229.

[13] S. L. Harrison and P. G. Buttner, "Do all fair-skinned caucasians consider themselves fair?" Prevent. Med., vol. 29, no. 5, pp. 349-354, 1999.

[14] A. I. Reeder, V. A. Hammond, and A. R. Gray, "Questionnaire items to assess skin color and erythemal sensitivity: Reliability, validity, and 'the dark shift'" Cancer Epidemiol. Prevent. Biomarkers, vol. 19, no. 5, pp. 1167-1173, 2010.

[15] M. E. Hill, "Race of the interviewer and perception of skin color: Evidence from the multi-city study of urban inequality," Amer. Sociol. Rev., vol. 67, pp. 99-108, January 2002.

[16] K. Krishnapriya, M. C. King, and K. W. Bowyer, "Analysis of manual and automated skin tone assignments for face recognition applications," 2021, arXiv:2104.14685.

[17] W. Westerhof, O. Estevez-Uscanga, J. Meens, A. Kammeyer, M. Durocq, and I. Cario, "The relation between constitutional skin color and photosensitivity estimated from UV-induced erythema and pigmentation dose-response curves," J. Investig. Dermatol., vol. 94, no. 6, pp. 812-816, 1990.

[18] V. Leenutaphong, "Relationship between skin color and cutaneous response to ultraviolet radiation in thai," Photodermatol. Photoimmunol. Photomed., vol. 11, nos. 5-6, pp. 198-203, October-December 1996.

[19] L. C. Pichon, H. Landrine, I. Corral, Y. Hao, J. A. Mayer, and K. D. Hoerster, "Measuring skin cancer risk in African Americans: Is the Fitzpatrick skin type classification scale culturally sensitive?" Ethnicity Dis., vol. 20, no. 2, pp. 174-179, 2010.

[20] G. R. Galindo et al., "Sun sensitivity in 5 U.S. ethnoracial groups," CUTIS NEW YORK, vol. 80, no. 1, pp. 25-30, 2007.

[21] M. S. Sommers et al., "Are the Fitzpatrick skin phototypes valid for cancer risk assessment in a racially and ethnically diverse sample of women?" Ethnicity Dis., vol. 29, no. 3, pp. 505-512, 2019.

[22] B. F. Klare, M. J. Burge, J. C. Klontz, R. W. V. Bruegge, and A. K. Jain, "Face recognition performance: Role of demographic information," IEEE Trans. Inf. Forensics Security, vol. 7, pp. 1789-1801, 2012.

[23] B. L. Diffey, "Ultraviolet radiation physics and the skin," Phys. Med. Biol., vol. 25, no. 3, pp. 405-426, 1980.

[24] M. van der Wal et al., "Objective color measurements: Clinimetric performance of three devices on normal skin and scar tissue," J. Burn Care Res., vol. 34, no. 3, pp. e187-e194, 2013.

[25] P. Clarys, K. Alewaeters, R. Lambrecht, and A. Barel, "Skin color measurements: Comparison between three instruments: The Chromameter(R), the DermaSpectrometer (R) and the Mexameter(R)," Skin Res. Technol., vol. 6, no. 4, pp. 230-238, 2000.

[26] I. L. Weatherall and B. D. Coombs, "Skin color measurements in terms of CIELAB color space values," J. Investig. Dermatol., vol. 99, no. 4, pp. 468-473, 1992.

[27] I. Nishidate, K. Sasaoka, T. Yuasa, K. Niizeki, T. Maeda, and Y. Aizu, "Visualizing of skin chromophore concentrations by use of RGB images," Opt. Lett., vol. 33, no. 19, pp. 2263-2265, 2008.

[28] J. S. Everett, M. Budescu, and M. S. Sommers, "Making sense of skin color in clinical care," Clin. Nursing Res., vol. 21, no. 4, pp. 495-516, 2012.

[29] O. R. Ware, J. E. Dawson, M. M. Shinohara, and S. C. Taylor, "Racial limitations of Fitzpatrick skin type," Cutis, vol. 105, no. 2, pp. 77-80, 2020.

[30] T. B. Fitzpatrick, "The validity and practicality of sun-reactive skin types I through VI," Archiv. Dermatol., vol. 124, no. 6, pp. 869-871, 1988.

[31] S. Y. He, C. E. McCulloch, W. J. Boscardin, M.-M. Chren, E. Linos, and S. T. Arron, "Self-reported pigmentary phenotypes and race are significant but incomplete predictors of Fitzpatrick skin phototype in an ethnically diverse population," J. Amer. Acad. Dermatol., vol. 71, no. 4, pp. 731-737, 2014.

[32] J. L. Chan, A. Ehrlich, R. C. Lawrence, A. N. Moshell, M. L. Turner, and A. B. Kimball, "Assessing the role of race in quantitative measures of skin pigmentation and clinical assessments of photosensitivity," J. Amer. Acad. Dermatol., vol. 52, no. 4, pp. 609-615, 2005.

[33] C. Ash, G. Town, P. Bjerring, and S. Webster, "Evaluation of a novel skin tone meter and the correlation between Fitzpatrick skin type and skin color," Photon. Lasers Med., vol. 4, no. 2, pp. 177-186, 2015.

[34] D. T. Levin and M. R. Banaji, "Distortions in the perceived lightness of faces: The role of race categories," J. Exp. Psychol. Gen., vol. 135, no. 4, pp. 501-512, 2006.

[35] W. G. Hayward, K. Crookes, and G. Rhodes, "The other-race effect: Holistic coding differences and beyond," Vis. Cognit., vol. 21, nos. 9-10, pp. 1224-1247, 2013.

[36] S. Eilers et al., "Accuracy of self-report in assessing Fitzpatrick skin phototypes I through VI," JAMA Dermatol., vol. 149, no. 11, pp. 1289-1294, 2013.

[37] C. Whitelam et al., "IARPA janus benchmark-B face dataset," in Proc. IEEE Conf. Comput. Vis. Pattern Recognit. Workshops, 2017, pp. 90-98.

[38] J. Hasselgren, J. Howard, Y. Sirotin, J. Tipton, and A. Vemury, "A scenario evaluation of high-throughput face biometric systems: Select results from the 2019 department of homeland security biometric technology rally," DHS Science and Technology Directorate Technical Paper Series, August 2020, [Online].

[39] A. P. Founds, N. Orlans, W. Genevieve, and C. I. Watson, "NIST special database 32-Multiple encounter dataset II (MEDS-II)," NIST, Gaithersburg, MD, USA, Rep. NISTIR 7807, 2011.

[40] M. J. Taylor and T. Morris, "Adaptive skin segmentation via feature-based face detection," in Proc. Real-Time Image Video Process., vol. 9139, 2014, Art. no. 91390P.

[41] B. L. Diffey, R. J. Oliver, and P. M. Farr, "A portable instrument for quantifying erythema induced by ultraviolet radiation," Brit. J. Dermatol., vol. 111, no. 6, pp. 663-672, 1984.

[42] K. C. Lee et al., "Investigating the intra- and inter-rater reliability of a panel of subjective and objective burn scar measurement tools," Burns, vol. 45, no. 6, pp. 1311-1324, 2019.

[43] J. R. Beveridge, G. H. Givens, P. J. Phillips, and B. A. Draper, "Factors that influence algorithm performance in the face recognition grand challenge," Comput. Vis. Image Understand., vol. 113, no. 6, pp. 750-762, 2009.

[44] P. J. Grother, J. R. Matey, E. Tabassi, G. W. Quinn, and M. Chumakov, "Irex VI-Temporal stability of iris recognition accuracy," NIST, Gaithersburg, MD, USA, Rep. NISTIR 7948, 2013.

CIELAB colorspace, also referred to as L*a*b*, is a colorspace defined by the International Commission on Illumination (abbreviated CIE) in 1976. (Referring to CIELAB as "Lab" without asterisks should be avoided to prevent confusion with Hunter Lab). It expresses color as three values: L* for perceptual lightness and a* and b* for the four unique colors of human vision: red, green, blue and yellow. CIELAB was intended as a perceptually uniform space, where a given numerical change corresponds to a similar perceived change in color. While the LAB space is not truly perceptually uniform, it nevertheless is useful in industry for detecting small differences in color. See "CIELBA COLOR SPACE" in wikipedia.org incorporated by reference in its entirety. Attachment A.

HCL (Hue-Chroma-Luminance) or LCh refers to any of the many cylindrical colorspace models that are designed to accord with human perception of color with the three parameters. Lch has been adopted by information visualization practitioners to present data without the bias implicit in using varying saturation.[1][2][3] They are, in general, designed to have characteristics of both cylindrical translations of the RGB colorspace, such as HSL and HSV, and the L*a*b* colorspace. See "HCL COLOR SPACE" in wikipedia.org" incorporated by reference in its entirety. Attachment B.

SUMMARY

Systems and methods for measuring skin tone are disclosed. A camera and computer may measure skin tone health of a face dataset and color quality of a single face image. The computer and camera may measure skin tone across wide sample of volunteers, express skin tone in CIELCH coordinates; and identify the range of observed lightness, chromaticity, and hue values in the population to determine a sample set. The computer and camera may be configured to match the image to a coordinate system of lightness, chromaticity, and hue in the sample set. If a match is not possible, the computer may be configured to select a coordinate closest to the measured lightness, chromaticity, and hue.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawing figures illustrate one or more implementations in with the teachings of this disclosure, by way of example, not by way of limitation. In the figures, like reference numbers refer to the same or similar elements. It will be understood that the drawings are not necessarily to scale.

FIG. 2A shows a distribution of ground-truth FALMs ($L_f$) using the colormeter device. Note the bi-modal distribution with apparently distinct peaks for each self-reported race category. FIG. 2B shows a distribution of $L_f$ values computed using images in the CE dataset. Note the significant overlap between $L_f$ values for the two race categories. FIG. 2C. shows a distribution of the range of $L_f$ values observed for each subject in the CE dataset. Note that $L_f$ value range frequently exceeds the $L_f$ difference between race categories. Dotted lines in A and B indicate equal error rate threshold. Triangles mark average within each race category.

FIG. 3A shows distributions of FALMs ($L_f$)

across B and W subjects for each dataset. FIG. 3B shows equal error rate between FALM distributions for B and W subjects. FIG. 3C shows a range of intra subject $L_f$ for each dataset. Error bars are standard deviation across subjects. Note Corrected (Corr.) and Ground-truth (GT) datasets had only one image per subject so range could not be computed. FIG. 3D shows Pearson correlation (p) between $L_f$ values from each dataset and the ground-truth colormeter $L_f$ values. Error bars are 95% confidence intervals.

FIG. 4A shows a distribution of self-reported FST by race. FIG. 4B shows a distribution of FALM ($L_f$) values within each FST category. Note the apparent association between FST and ($L_f$). Horizontal line corresponds to overall equal error rate (EER) classification threshold.

FIG. 5A shows results of a simulated experiment with a known relationship whereby a simulated score is a function of face area lightness measure (FALM), gender, age (age not shown), and additive noise. Score is not a function of race. FIG. 5B show a proportion of times each demographic factor is selected based on model fits to resampled data FALM from different datasets. Note that the likelihoods of erroneously selecting race (a type II error) and excluding FALM (a type I error) becomes greater with reduced level of control in the dataset acquisition conditions. FIG. 5C shows parameter estimates for each demographic factor included in models fit to resampled data using different FALM estimates. Red lines denote parameter estimates used to generate the simulated scores. Note that the parameter estimate for FALM decreases with reduced level of control while the parameter estimate for race is increased. Error bars are 95% bootstrap confidence intervals.

FIG. 9A shows a range of ethnicities. FIG. 9B shows a graph of hue and lightness skin tone for people that identify as White. FIG. 9C shows a graph of hue and lightness skin tone for people that identify as Black or African American. FIG. 9 shows a graph of hue and lightness skin tone for people that identify as Black or African American and White with an overlapping area identified.

FIG. 13A shows two CIELAB colors and their mapping on a hue/lightness graph for skin tone. FIG. 13B illustrates there is sparse coverage on a Spyder Check 48 colorchecker for various skin tones.

FIG. 13C shows a point that is considered too light for face skin. FIG. 13D shows that the X-Rite Digital Color Checker has sparse, incomplete, and uneven coverage for various skins tones. FIG. 13E shows points outside the Google Monk Scale.

DETAILED DESCRIPTION

Section I

Figure 1:
FIG. 1 shows a DSM III Colormeter by Cortex Technology.

With increasing adoption of face recognition systems, it is important to ensure adequate performance of these technologies across demographic groups, such as race, age, and gender. Recently, phenotypes such as skin tone have been proposed as superior alternatives to traditional race categories when exploring performance differentials. However, there is little consensus regarding how to appropriately measure skin tone in evaluations of biometric performance or in AI more broadly. Biometric researchers have estimated skin tone, most notably focusing on face area lightness measures (FALMs) using automated color analysis or Fitzpatrick Skin Types (FST). These estimates have generally been based on the same images used to assess biometric performance, which are often collected using unknown and varied devices, at unknown and varied times, and under unknown and varied environmental conditions. In this study, we explore the relationship between FALMs estimated from images and ground-truth skin readings collected using a colormeter device specifically designed to measure human skin. FALMs estimated from different images of the same individual varied significantly relative to ground-truth FALMs. This variation was only reduced by greater control of acquisition (camera, background, and environmental conditions). Ground-truth FALMs to FST categories obtained using the standard, in-person, medical survey are compared. Research revealed that there was relatively little change in ground-truth FALMs across different FST category and that FST correlated more with self-reported race than with ground-truth FALMs. These findings show FST is poorly predictive of skin tone and should not be used as such in evaluations of computer vision applications. Models are generated to show that noisy FALM estimates can lead to erroneous selection of race as a key correlate of biometric performance when face recognition performance is driven by FALMs and independent of race. These results demonstrate that measures of skin type for biometric performance evaluations must come from objective, characterized, and controlled sources. Further, despite this being a currently practiced approach, estimating FST categories and FALMs from uncontrolled imagery does not provide an appropriate measure of skin tone.

Biometric technologies are increasingly being adopted for use as a means of asserting identity in banking, medicine, travel, and a variety of government applications. As reliance on biometrics increases, it is important to demonstrate that these technologies are not only accurate, but also fair, i.e., that they are consistently accurate for different groups of people. Many factors can contribute to differences in accuracy across groups, such as algorithm architecture, training image properties, biometric properties, training set composition, test image properties, and individual behavior[1]. Thus, it is important to test candidate biometric systems to quantify any differences between groups to help determine whether they are fair. However, the process of dividing individuals into different categories or groups for evaluation can be problematic.

Face recognition is a type of biometric that can identify a human individual by using the unique physiological features of their face. Previous studies of fairness in face recognition have divided individuals into demographic groups including gender and race [2], [3], [4]. However, grouping individuals based on social categories has several drawbacks. First, social categories evolve over time, causing some individuals to shift group membership and causing some groups to disappear altogether. Second, different regions can have different social categories and social category definitions. Finally, social category definition sets are not guaranteed to reflect the range of variation of face physiological features in a population [5]. For these reasons, recent studies have proposed relating performance to phenotypic measures as a more scientifically useful analysis of algorithm fairness [6], [7]. Phenotypes are observable characteristics of a person and as such may offer better explanations of any observed biometric performance variation. However, techniques for assigning phenotypes to individuals are currently understudied. In [7], images were taken from government websites of three African countries and three European countries and manually assigned a numerical value inspired by the Fitzpatrick Skin Type (FST) categories. Since then, FST has been proposed as a measurement of relevance in additional face biometric studies [8], [9], [10], studies of fairness in self-driving car algorithms [11], and even proposed as a common benchmark for detailing the performance characteristics of machine learning algorithms generally [12]. If FST is to become a consensus measure of relevance in machine learning more broadly and in fairness studies specifically, it's appropriate to scrutinize both its use and the way in which it has been measured in previous studies. A good measure of skin type should be 1) consistent and 2) representative of the underlying phenotype. Unfortunately, the degree to which skin type measured from images meets these two criteria has not been well assessed and there are reasons to question the efficacy of this practice. For example, face skin lightness in a photograph might be hard to distinguish from the amount of light illuminating the face (due to variation in face pose and ambient illumination when the photograph was taken) and from variation in camera settings (e.g., aperture, shutter speed, ISO). Also, in regards to FST, existing behavioral literature has found humans do not always accurately determine FST [13], [14], [15], [16]. Finally, the fundamental appropriateness of FST as a skin type metric has not been explored in the context of computer science tasks, despite documented concerns from the medical community as to the effectiveness of the FST measure [17], [18], [19], [20], [21]. In this application, the term Face Area Lightness Measures (FALMs) means any technique for characterizing the intensity of light reflected by human skin in the facial region, as measured by a sensor (this has been called many things in previous studies: lighter/darker-skin [7], [8], tone [9], [10], [11], reflectance [6], etc.). Methods for assessing variation in FALMs estimated from images taken in various environments, at various times, and on various devices and compare these measures to ground-truth measurements from a calibrated dermological device, designed specifically to measure skin lightness are presented. The suitability of FST as a proxy to FALMs by comparing ground-truth FALM readings with subjects' self-reported FST is explored. Finally, data simulation and modelling to show that poor FALM estimations can result in the erroneous selection of categorical demographic race as the significant explanatory cause of performance variation, even when this variation is primarily driven by FALMs is performed.

Section II

A) Demographics and Biometric Performance.

Prior studies have examined differences in biometric performance across demographic groups. For instance, face recognition algorithms trained on one demographic were found to perform better on that demographic [22]. Another study noted that some face datasets used for algorithm development under-represented people with darker skin and that gender classification algorithms had poorer performance for women with darker-skin [7].

However, it is not clear whether skin tone and race can be used interchangeably and are equally related to biometric performance or indeed contribute equally to different measures of biometric performance. For example, in a dataset captured during a biometric scenario test that simulated real world capture conditions on eleven commercial face recognition systems, subjects with lower relative skin reflectance (darker skin) had lower mated similarity scores than subjects with high reflectance [6]. Using statistical modelling, [6] also found skin reflectance, as measured by the same ground-truth sensor used here (see Section III-D), was a better predictor of mated score performance than self-reported race labels. This effect was not uniformly observed across all eleven cameras, with the effect being "almost negligible" for the best cameras.

A subsequent study looked at face recognition performance on a static dataset, collected with a single camera, in con-trolled lighting and background conditions [9]. Their results differ from [6] in that African-American subjects had lower FNMR (and presumably higher mated scores) than White subjects. Using "FST" values assigned by a three-person panel, via image examination, [9] also concludes these results (and other effects on false match rate) were not due to skin tone. Interestingly, all three reviewers in [9] agreed on skin tone assignment in only roughly one-third of subjects. Finally, in the largest study of its kind to date, [4] found "[t]he lowest false negative rates occur in black faces," but did not attempt to quantify skin type values from the images in their dataset. Discrepancies between [4] and [6], [9] are not entirely surprising as each used different datasets, algorithms, and race/skin-type labeling practices.

B) Optical Properties of Skin and Skin Type

Measurement of skin optical properties depends on the degree to which skin reflects, absorbs, scatters, and transmits incident light [23]. Skin is a heterogeneous surface and is affected by variable amount of blood irrigation and pigmentation. Three layers of skin are visible from the surface: epidermis, dermis, and variable amounts of subcutaneous adipose tissue. The living part of the epidermis is the location of most skin pigmentation, which is caused by variable numbers of red/yellow phaeomelanin and brown/black eumelanin. In the dermis, blood, hemoglobin, beta carotene and bilirubin can absorb light, while the fibrous structure of the dermis produces scattering. Skin erythema contributes to skin redness and is related to the dilation of blood vessels nearest to the surface of the skin [23], [24].

Spectroscopic analysis of skin under controlled conditions allows accurate determination of the constituent chromophores. In clinical practice, spectroscopy is routinely used to estimate melanin and erythema content using calibrated Colormeter devices created for this purpose [24], [25]. In addition to readings of melanin and erythema, these devices provide sRGB color that can be converted to the L*a*b* colorspace where lightness is represented by the L* parameter [26]. Under well controlled laboratory conditions, such readings have also been demonstrated as possible using RGB cameras [27], [28].

C) Fitzpatrick Skin Type Classification

The Fitzpatrick Skin Type (FST) is the most used skin classification system in dermatology [29]. The FST was originally designed to classify the UV-sensitivity of individuals with white skin for determining doses of ultraviolet A phototherapy, a treatment for dermatitis and other skin disorders. The original FST instrument was released in 1975 and included four skin types (I-IV). It was updated in 1988, adding two additional skin types to account for individuals with darker skin (V-VI) [30].

According to medical literature, there are two ways of establishing the FST of an individual: self-report or third-party direct assessment by an expert, both are subjective and involve recording the subject's answers to questions about skin responses to sun exposure. Fitzpatrick Skin Type was initially described as self-reported only [30]. In later studies, doctors estimated FST after an in-person inspection [29], [31]. However, even with access to the physical subject, the FST system is known to be generally unreliable estimator of skin pigmentation [17] and FST types are known to be specifically less reliable for non-White individuals [18], [19], [20], [21]. Interestingly, physician-assessed FST types have been demonstrated to correlate with race, but when FSTs are self-reported, the relationship between FST and race is not consistent [31], [32], [33]. Indeed, recent work has pointed out that the FST in medicine, in addition to measuring skin reactivity to ultraviolet illumination, is now also sometimes used as a proxy for race, which confounds the interpretation of the measure [29]. Some medical researchers have even argued against any subjective assessments of skin type, favoring a more quantitative approach using calibrated spectrophotometers or digital cameras [28].

In 2018, FST was utilized, for the first time, as a proxy for darker/lighter-skin in the evaluation of a computer algorithm. That paper discussed the accuracy of gender classification algorithms across FST groups derived from face photos [7]. This spurred numerous other computer science papers where the relationship between FST measures and performance was measured in domains such as face recognition [8], [9], [10], [16] and pedestrian detection for self-driving cars [11]. FST has even been proposed as a standardized method for documenting the performance of a generic machine learning algorithm [12].

Crucially, the FST measures in [7], [9], and [11] were deter-mined by third-party assessment of previously acquired images of individuals. No direct assessment or self-report was performed as part of these studies, despite being the documented method of arriving at an FST classification, as laid out in the medical literature [29], [30], [31]. Additionally, these studies did not attempt to validate that their third-party, remote assessments of FST were accurate representations of actual FST measures and did not address the well documented concerns of the medical community with the FST approach to skin color classification [17], [18], [19], [20], [21]. It is well established that human perception of face color is known to be affected by race [34] and by the color of other face features, such as lips [35]. Furthermore, any accurate assessment of skin type from a photograph may depend on the camera system and degree to which skin tone in images is represented reliably. This representation is affected by pose, ambient lighting, choice of camera, and likely many more factors. The concerns with third-party assessment of FST were supported by a 2021 study measured the consistency of FST ratings across different people and against automated measures, finding notable variation and inconsistencies between raters for a single image and between automated measures from different images of the same person [16].

Finally, it is important to note that, when using ordinal scales, like FST, in scientific studies, altering either the sur-vey instrument or the assigned categories alters the scale. FST refers to a 6 point scale, where individual options are related to sun burn and skin sensitivity to UV exposure (see Section III-E). FST is arrived at my asking specific questions to the subject in question or by direct physician examination [21], [31], [33], [36]. Other scales, such as the IARPA IJC-B skin tone descriptions [37], are not described as FST, despite also being a 6 point scale. This is because both the categories and the survey instrument are different. Categories in [37] are determined by Amazon Mechanical Turk workers (with no access to the physical subject they are labeling) and are on a scale of increasing skintone darkness. Using different category labels or a different method for arriving at these labels are unlikely to produce the same ratings as the other instruments. When new ordinal scales are introduced, care must be taken to explain both how this scale was developed and how it validated against the underlying phenomena the scale is measuring.

Section III

L*a*b* colorspace, particularly the L*, or lightness, component has been proposed a quantitative means for the communication of skin-color information. It is advantageous over other colorspace representations because changes in the L* dimension relate directly to changes in human perception [26]. In this study we leverage the L*a*b* colorspace, and refer to different approaches to characterize light reflected by the skin, from the facial region and measured by a sensor, as Face Area Lightness Measures (FALMs).

The source of our subject and image data is outlined in Section III-A. The subject and image data is further arranged into various datasets that vary by level of control in Section III-B. FALMs estimated from images in these datasets (Section III-C) is compared to ground-truth FALMs collected by a calibrated instrument (Section III-D) to establish the consistency and appropriateness of different FALM techniques. Ground-truth FALMs are also compared to self-reported FST categories (Section III-E).

A. Sources of Subject and Image Data

Data for this study came from two sources. Fist, the Maryland Test Facility (MdTF) is a biometrics research lab affiliated with the U.S. Department of Homeland Security (DHS) that has been in operation since 2014. As part of bio-metric technology evaluations at the MdTF, human subjects are recruited as test participants from the general population. In particular, a test in May of 2019, acquired face photographs from 345 human subjects on nine different acquisition devices [38]. These photographs ("Acquisition Images") were compared to other face photographs that had been collected for each subject over a period of 1-5 years preceding the 2019 test ("Historic Images"). Historic images were collected on a variety of different face biometric acquisition devices at the MdTF. Acquisition Images from the nine acquisition devices were also compared to high-quality face photographs, captured by a trained operator, using a Logitech C920 webcam ("Enrollment Images"). Enrollment Images were captured in front of a neutral grey background in accordance with ISO/IEC 19794-5. All race information from MdTF subjects was self reported by the subjects upon study enrollment. Also, as part of [38] ground-truth measures were taken using a calibrated dermographic instrument, specifically designed to measure skin (see Section III-D).

TABLE I

Images and Subjects Per Source Examined in This Study

| Source | Race | Images | Subjects |
| --- | --- | --- | --- |
| MEDS Images | B | 595 | 184 |
| MEDS Images | W | 458 | 229 |
| Historic Images | B | 1874 | 181 |
| Historic Images | W | 1710 | 164 |
| Acquisition Images | B | 1458 | 181 |
| Acquisition Images | W | 1320 | 164 |
| Enrollment Images | B | 181 | 181 |
| Enrollment Images | W | 164 | 164 |

The second data source of images for this study is Special Database 32-Multiple Encounter Dataset ("MEDS Images") from the U.S. National Institutes of Science and Technology (NIST). The MEDS dataset consists of mugshot photos from individuals who have had multiple encounters with law enforcement [39]. Race information from these subjects is included as part of the MEDS dataset but was assigned by a third party, not self reported by the subject. Table I summarizes the number of subjects and images for each data source used in this study. In both sources, subjects assigned or self reported a race other than Black (B) or White (W) were limited in numbers and thus removed from the analysis presented in this manuscript.

B. Face Area Lightness Datasets

To study the effect of various controls during the photographic acquisition process on FALMs, the data described in Section III-A were arranged into seven distinct datasets. Each of these datasets afforded different levels of control for environment, capture time, and device. For each of these datasets, FALMs were calculated based on the information available. Table II shows the seven face area lightness datasets used in this study and the corresponding FALM ($L_f$) equations. Sections III-C and III-D outline the techniques used to calculate the FALM values for each dataset.

C. FALMs from Images

To assess FALMs from images, pixels falling on the skin of the face were selected by face finding, circular masking, and outlier removal using methods adapted from [40] and previously used by [6]. The sRGB values of face skin pixels were averaged and converted from sRGB to the L*a*b* colorspace using the D65 illuminant. FALMs ($L_f$) were estimated from the resulting L* channel.

FALMs from the MEDS dataset images came from varied environment, varied devices, and varied acquisition times. The CE and CET datasets consist of images collected in the constant environment of the MdTF, i.e., a single location with controlled/standard office lighting (600 Lux). The CET dataset consisted of images collected in a single day, i.e., constant time, ruling out any variation in subjects' actual skin pigmentation across these images. For images in the MEDS, CE, and CET datasets there is no way to normalize $L_f$ values further and the FALM for these datasets are calculated as described in the previous paragraph.

However, the CED and CEDT datasets consist of images collected at the MdTF that are associated with specific acquisition devices. Using this information, we controlled FALM $L_f$ values for imaging device d to generate controlled $L_{f,d}$ values by subtracting the average FALM values within each device $L_{f,d}$ and adding the grand average face image lightness $L_f$.

The "Corrected" dataset consists of only Enrollment Images (see Section III-A). In addition to being collected by a single acquisition device, these images are captured in front of a neutral grey background. Consequently, they can be corrected for background image lightness. This correction was performed by subtracting background lightness $L_{b,d}$ from FALM $L_{f,d}$ and reconstituting with the average difference between face and background lightness. Table II (rows i-vi) shows the six datasets of FALM values from images used in this study.

D. Ground-Truth FALMs from Calibrated Equipment

As part of [38], ground-truth FALMs were recorded using a calibrated hand-held sensor (DSM III Colormeter, Cortex Technology, FIG. 1). The sensor measures skin color using an RGB sensor to image a 7 mm2 patch of skin under standard illumination provided by two white light emitting diodes. The device can accurately measure the color as well as erythema and melanin content of skin [25], [41].

For each of the 345 subjects in [38], two bilateral measurements were collected by placing the colormeter on each subject's face approximately on the subject's zygomatic arch. The two sRGB measurements were collected in close succession and converted to the L*a*b* colorspace using the D65 illuminant ($L_{rc}$ and $L_{lc}$). The subjects' skin was not cleaned prior to collection. As such, the colormeter measures are likely related to subjects' facultative pigmentation as well as any contributions from makeup in a manner similar to subjects' face images from cameras. The skin contacting surfaces of the colormeter were wiped with rubbing alcohol between subjects and the device itself was calibrated twice a day using a standardized procedure involving a white calibration plate provided by the colormeter manufacturer. Ground-truth FALM readings matched skin tone readings reported in prior work [24], [42] were verified. Colormeter readings were collected on the same day as the images in the Enrollment and Acquisition image set and are from the same test subjects. Images in the Historic image set are also from these same test subjects, but were collected on days prior to the day when colormeter readings were taken (see Section III-A).

TABLE II

Face Area Lightness Datasets Examined

| | Dataset (a) | Source | Image Based | Environment (E) | Time (T) | Device (D) | Face Area Lightness Measure ($L_f$) |
|---|---|---|---|---|---|---|---|
| i | MEDS | MEDS | Yes | Varied | Varied | Varied | $L_f$ |
| ii | CE | Historic & Acquisition | Yes | Constant | Varied | Varied | $L_f$ |
| iii | CET | Acquisition | Yes | Constant | Constant | Varied | $L_f$ |
| iv | CED | Historic & Acquisition | Yes | Constant | Varied | Controlled | $L_{f,d} - \mu_{f,d} + \mu_f$ |
| v | CEDT | Acquisition | Yes | Constant | Constant | Controlled | $L_{f,d} - \mu_{f,d} + u_f$ |
| vi | Corrected | Enrollment | Yes | Constant | Constant | Constant | $(L_{f,d} - L_{b,d}) + \tfrac{1}{2}(\mu_{f,d} - \mu_{b,d})$ |
| vii | Ground-Truth | Colormeter | Yes | Constant | Constant | Constant | $\tfrac{1}{2}(L_{rc} + L_{lc})$ |

TABLE III

FST Question Response Options

| Option Text | FST |
|---|---|
| Highly sensitive, always burns, never tans | I |
| Very sun sensitive, burns easily, tans minimally | II |
| Sun sensitive to skin, sometimes burns, slowly tans to light brown | III |
| Minimally sun sensitive, burns minimally, always tans to moderate brown | IV |
| Sun insensitive skin, rarely burns, tans well | V |
| Sun insensitive, never burns, deeply pigmented | VI |

E. Self-Reported Fitzpatrick Skin Type

Also as part of [38], each subject self-reported their FST as part of a paper survey. There are several ways to self-report FST, which vary in question, wording, the number of questions, and description of FST categories [21], [31], [33], [36]. The method we selected uses the single-question measure adapted from [36] because of its simplicity and because it includes specific descriptors that are more meaningful for darker skin tones. Participants were asked "Which of the following descriptions best matches your skin type?" and allowed to select one option from a list that was most consistent with their experience. Table III shows the options provided and their mapping onto FST skin types, per [36]. Responses were digitized for each test subject.

Section IV

A. Variation in Image-Based FALMs

Figure 2A:
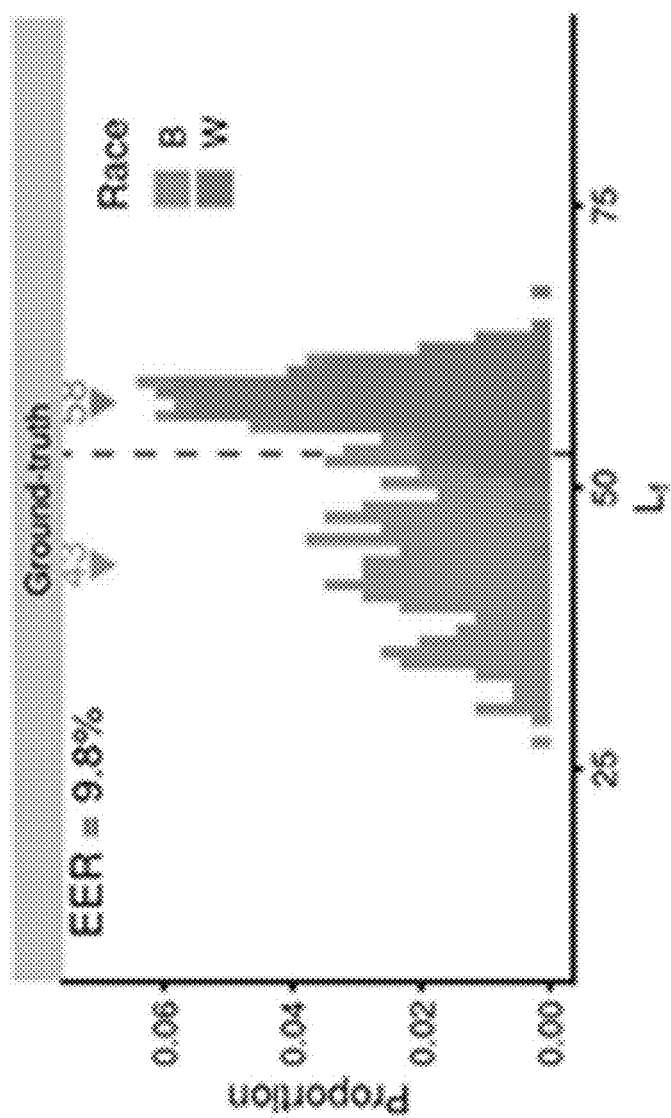
FIGS. 2A-2C show Distribution of face area lightness measures (FALM) from the ground-truth colormeter device and from images.

FIG. 2A shows the distribution of ground-truth FALM values for the 181 Black and 164 White test subjects in the face data set (Table II, row vii). We note little overlap between the two distributions and an equal error rate (EER) of 9.8%, if a simple threshold based classification scheme were used. Conversely, FALM values estimated from images where device and acquisition time varies (the CE dataset) were more broadly distributed (FIG. 2B) such that the distributions of FALMs between the two race categories overlapped to a greater extent (EER=32.2%).

Figure 2B:
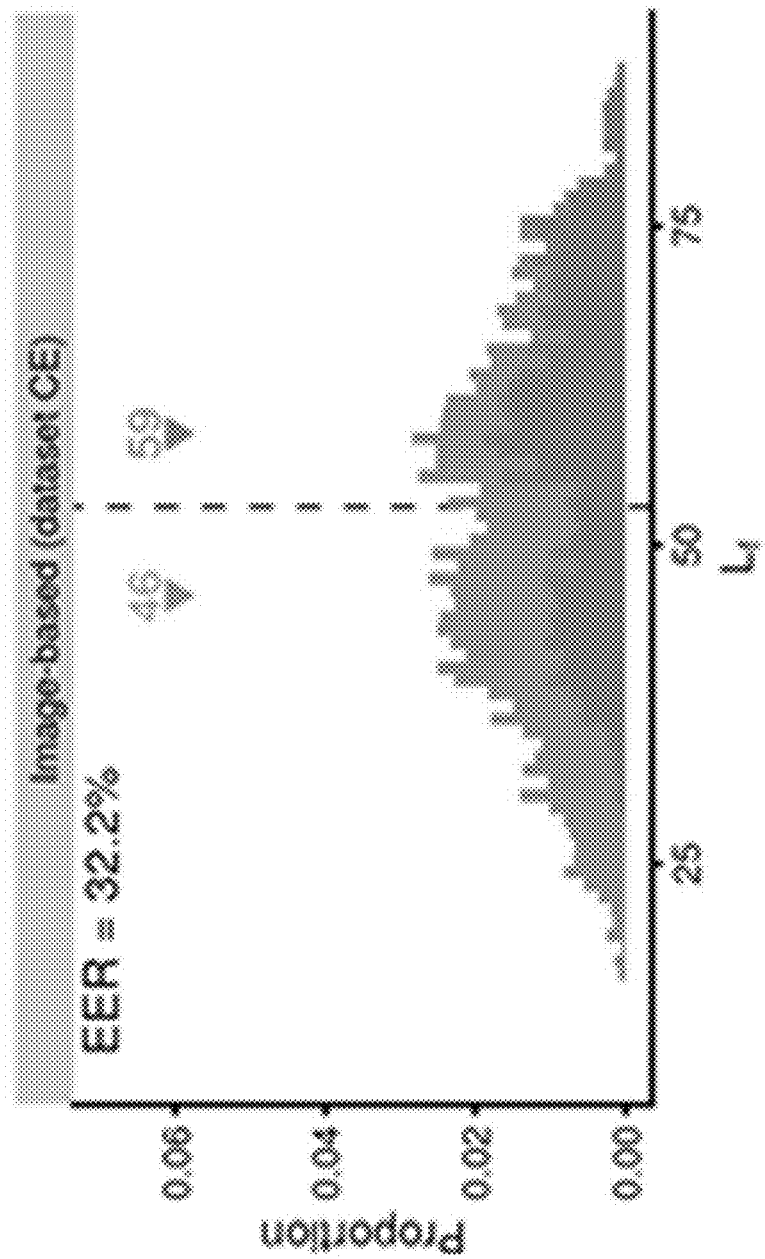
Figure 2C:
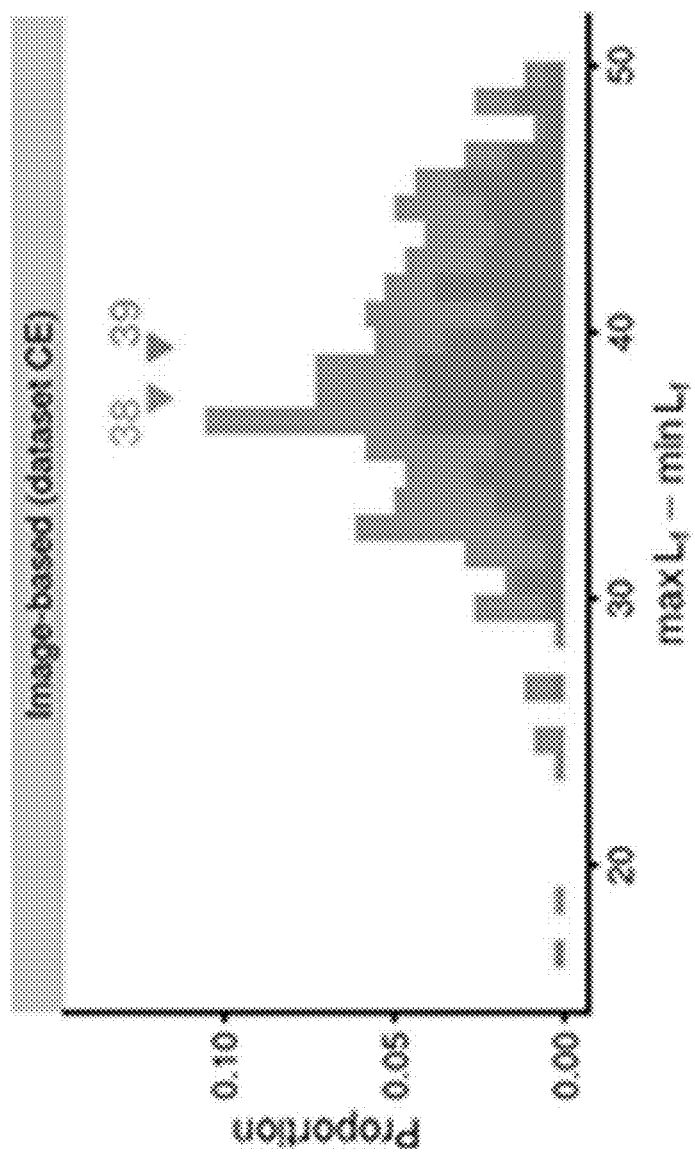

This overlap was due to large variations in FALM values within subjects when FALMs were taken from images. FIG. 2C shows the range of FALM values for each individual in the CE dataset. These intra-subject FALM values ranged, on average, by 38 units for Black or African American subjects and by 39 for White subjects, corresponding to more than a 2-fold difference in measured face area lightness, for a single subject, from image to image. This variation across images is 3 times larger than the 13 point difference in the average FALM of individuals in the two race groups (FIG. 2B).

B. Control in Image-Based FALMs

If images captured on various devices at various times are unsuitable for estimating ground-truth FALMs, what level of control must be added to image capture to allow for FALMs from images that approaches the ground-truth FALMs of the colormeter? To answer this, we next examined how controlling certain factors during image acquisition impacts the image-to-image variation in image-based FALM.

Figure 3A:
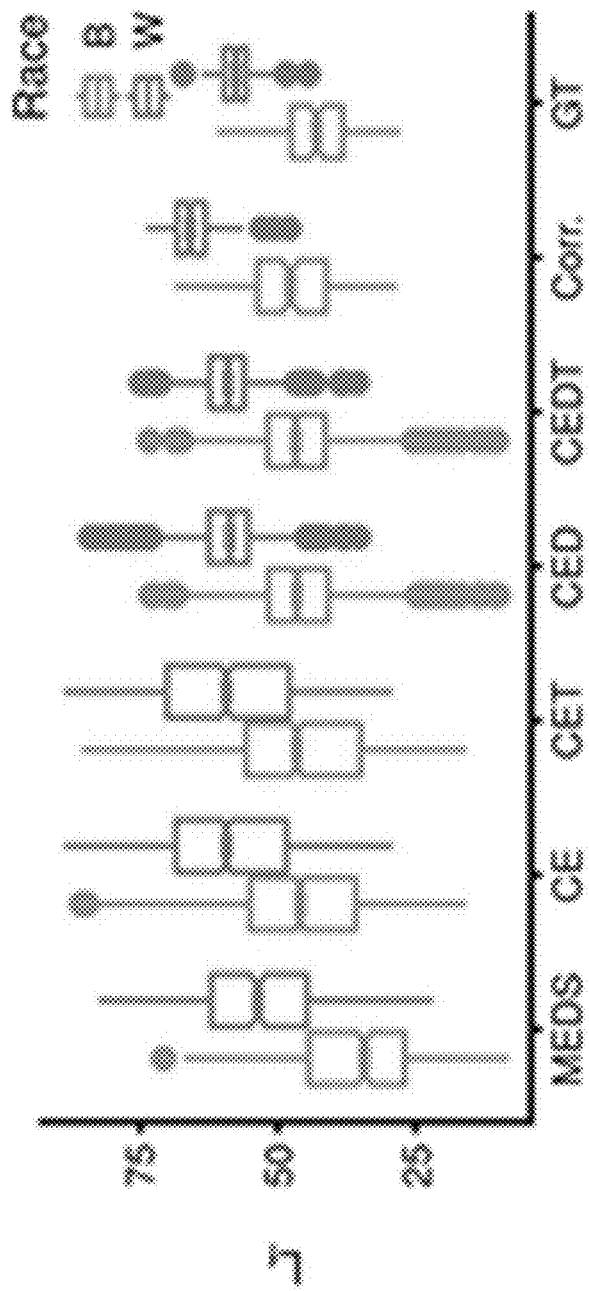
FIGS. 3A-3D show variation in face area lightness measures (FALMs).
Figure 3B:
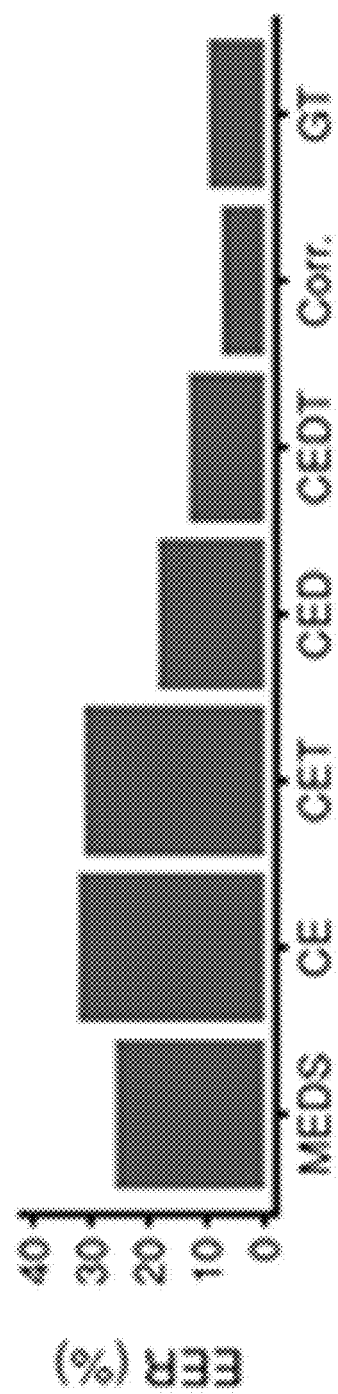
Figure 3C:
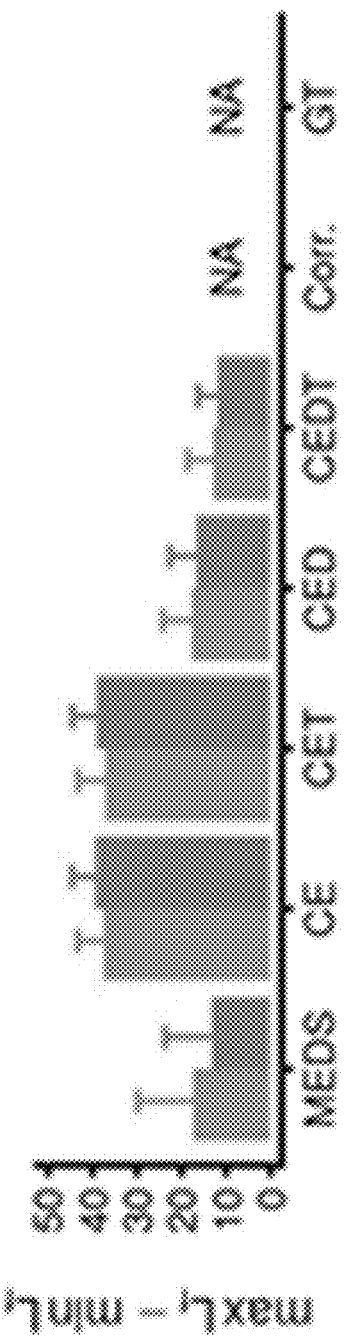

FIG. 3A shows the distributions FALMs from the datasets described in Table II. As our measure of similarity to the ground-truth FALMs from the colormeter, we quantified the EER between FALM distributions across race categories in FIG. 3B (recall from FIG. 2 that the distributions of ground-truth FALMs disaggregated by race has an EER of 9.8%). The range of intra-subject FALM values for each dataset (FIG. 3C) was quantified as a measure of image-to-image variation within the subject. The range of FALM values could not be computed for the Corrected (Corr.) or Ground-truth (GT) datasets because they had only one sample per subject.

C. Lightness, Race, and Fitzpatrick Skin Type

When estimating FALMs from images, EER was highest when only environment was controlled (CE dataset, EER=32%) and lowest for the Corrected dataset (EER=8%). The EER of 8% for the Corrected dataset was comparable to the EER of ground-truth FALMs as measured by the colormeter (GT dataset, EER=9.8%). The biggest single decline in EER and in the range of FALM values for each individual was observed when controlling for device (compare CED and CET in FIGS. 3B and C). This result suggests that variation across imaging devices is a major source of lightness variation when the images are acquired in a common environment.

In terms of EER, the MEDS dataset fell between the CET and CED datasets. The average range of FALM values for MEDS images was lower than for CE or CET datasets. However, MEDS images also had generally lower FALM values for subjects in both race categories (FIG. 3A). Overall, observations for the MEDS dataset are in line with those from the datasets based on images from the MdTF and suggests caution when using FALM from images, gathered without strict controls and corrections, as a phenotypic measure.

Figure 3D:
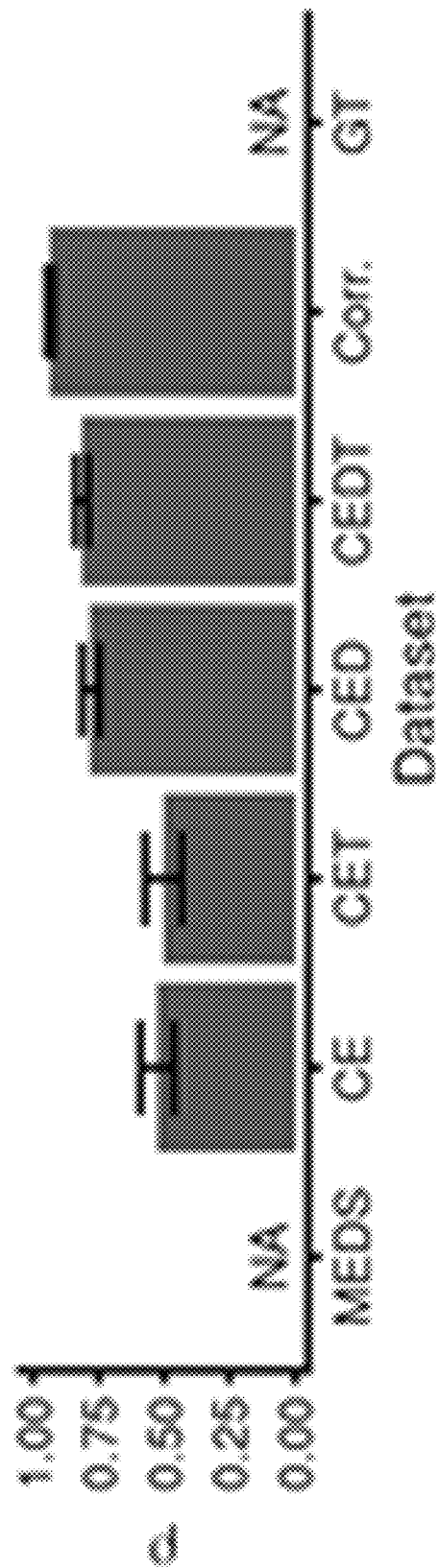

Finally, we measured the correlation between FALM values estimated from images and ground-truth FALMs quantified by the colormeter (FIG. 3D). Correlation could not be estimated for the MEDS dataset because it had distinct subjects. The correlation for the CE dataset was poor (dataset CE, Pearson's $\rho$=0.45). However, correlation improved when controlling for acquisition device and time (dataset EDT, Pearson's $\rho$=0.78). Correlation was highest for the Corrected dataset comprised of FALM values from images taken on a single device, under controlled conditions, with correction for neutral grey background (dataset Corr., Pearson's $\rho$=0.92). This indicates that, under controlled conditions, image-based FALM values are good estimates of ground-truth FALMs from the colormeter instrument.

Figure 4A:
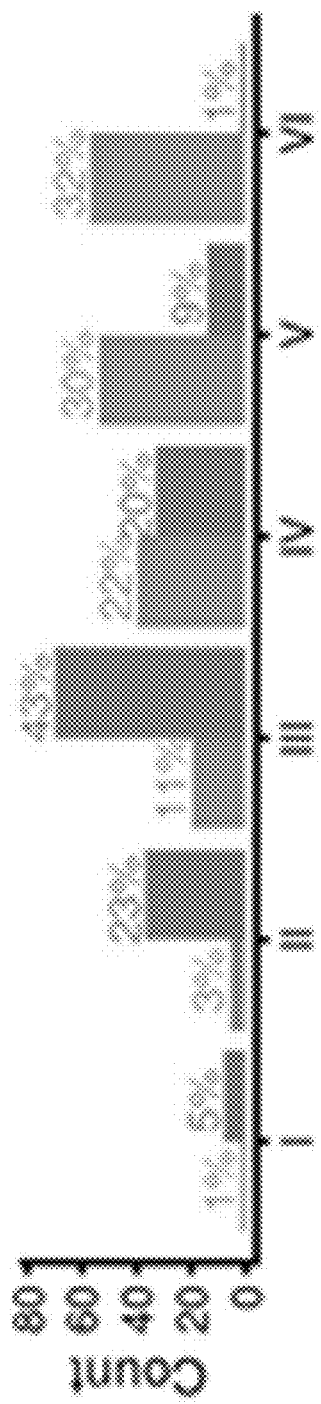
FIGS. 4A-4B show a relationship between Fitzpatrick Skin Type (FST) score and face area lightness measurements (FALMs).

We next examined the relationship between self-reported FST, self-reported race, and ground-truth FALMs from the colormeter. Each subject assessed their own FST according to a standard scale (Table III). FIG. 4A shows that FST was distributed differently when disaggregated by race ($\chi^2(5)$=128.1, $p<<0.001$). Subjects that self-identified as Black or African-American chose FST VI most frequently whereas subjects that self-identified as White chose FST III as the most frequent category.

Figure 4B:
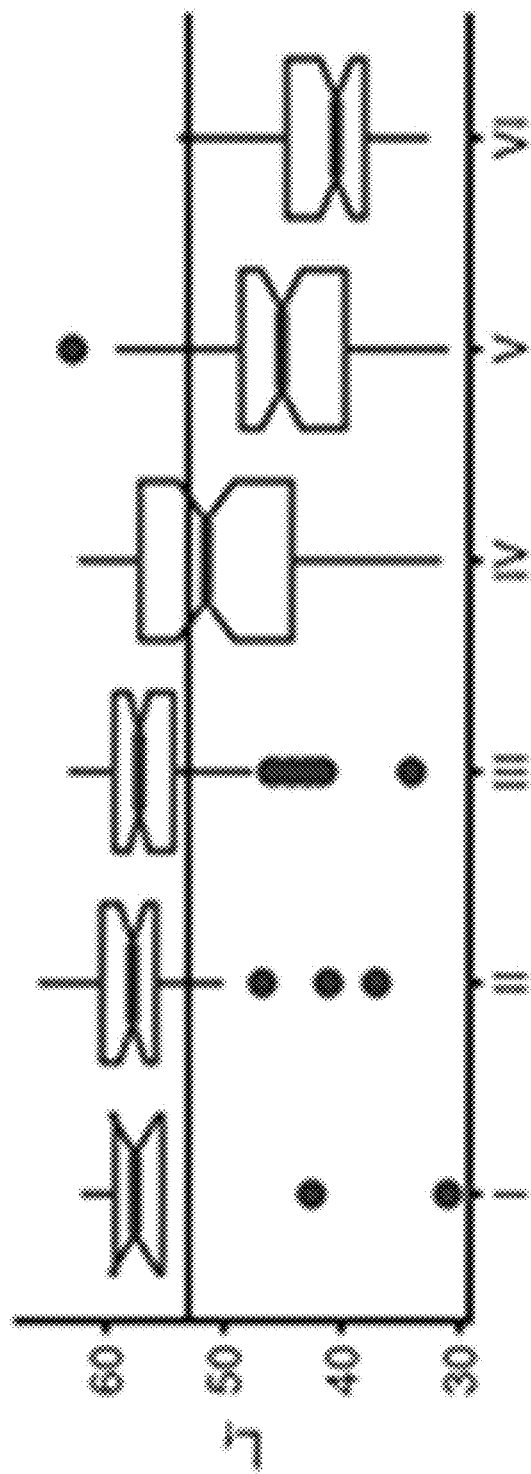
Figure 4C:
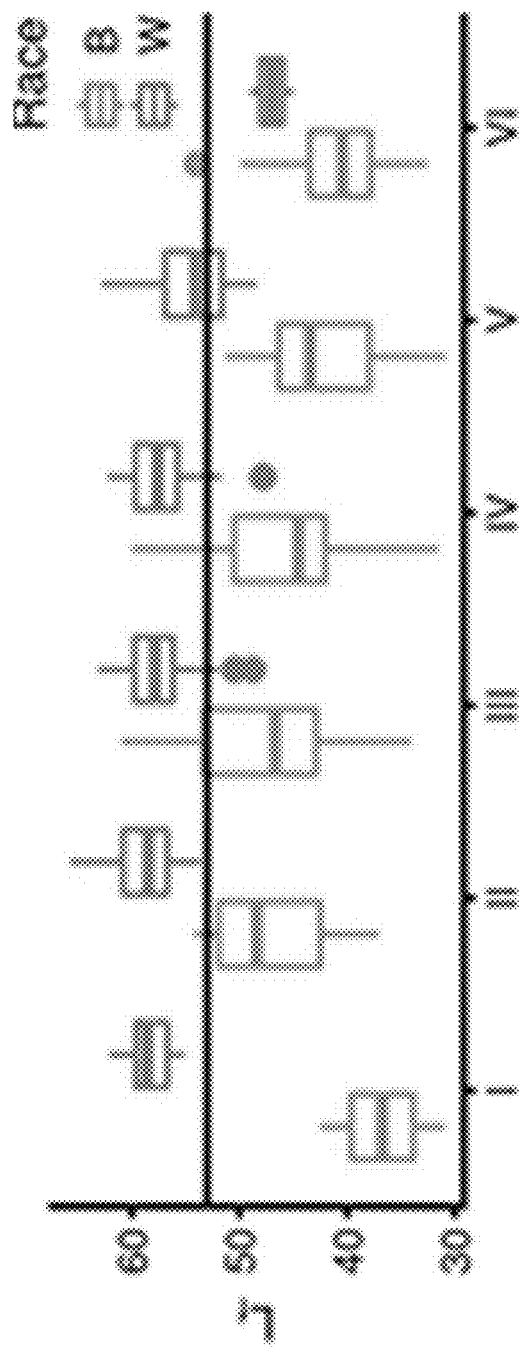
FIG. 4C shows a distribution of ($L_f$) within each FST category by race. Note relatively smaller relationship between FST and ($L_f$) and relatively large separation between ($L_f$) distributions for each race within each FST category.
Figure 4D:
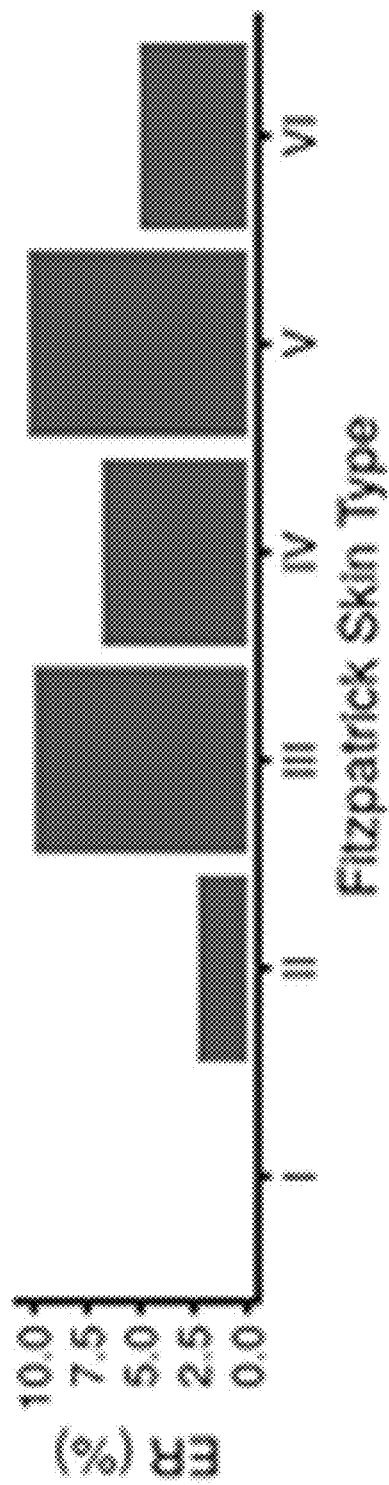
FIG. 4D shows error rate (ER) values for race classification based on ($L_f$) within each FST category using the overall EER threshold.

Intuitively, given that ground-truth FALM values also varied by race (FIG. 2A), we expected to observe a strong overall association between ground-truth FALMs and FST. This was confirmed in FIG. 4B. However, the apparent shift in FALM distributions observed in FIG. 4B were actually due to different proportions of individuals from each group choosing each FST category (FIG. 4A) while distributions of ground-truth FALMs within each race category remained largely invariant to FST (FIG. 4C). Indeed, using the EER threshold for the full population (Lf=52, FIG. 3A), there was little cross over between B and W ground-truth FALM distributions within each FST category. This EER value peaked at only 10% within FST III (FIG. 4D), roughly equal to the whole group EER of 9.8% from FIG. 2A.

Our conclusion is that FST is not a good predictor of ground-truth FALMs from the colormeter. We measured the degree of association between FST, race, and ground-truth FALMs. Correlation between FST and ground-truth FALMs (Kendall's $\tau$=0.51) was lower than between race and ground-truth FALMs (Kendall's $\tau$=0.68). Bootstrap resampling showed the difference between these correlations to be significant ($\tau$race—$\tau$FST=0.17, 95% CI=0.11-0.23). Within each race category, the correlation between FST and ground-truth FALMs decreased (Kendall's $\tau$=0.23) showing that most of the association between FST and ground-truth FALMs in our sample is due to the different proportions of subjects belonging to each race group choosing each FST category.

The relatively poor association between FST and ground truth FALMs was confirmed by linear modelling of ground-truth FALMs with FST, which produced a poor fit ($L_f$~FST, $R^2$=0.48) relative to using race information alone ($L_f$~race), $R^2$=0.72). Including both terms in the model hardly improved the fit over race alone ($L_f$~FST+race), $R^2$=0.77), although the full model fit was significantly better (F(1) =429.68, $p$=2.2e$^{-16}$). This shows that race is actually a superior independent predictor of skin tone relative to self-reported FST, although FST does carry some additional information about skin tone.

D. Impact of Level of Control on Data Interpretation

Figure 5A:
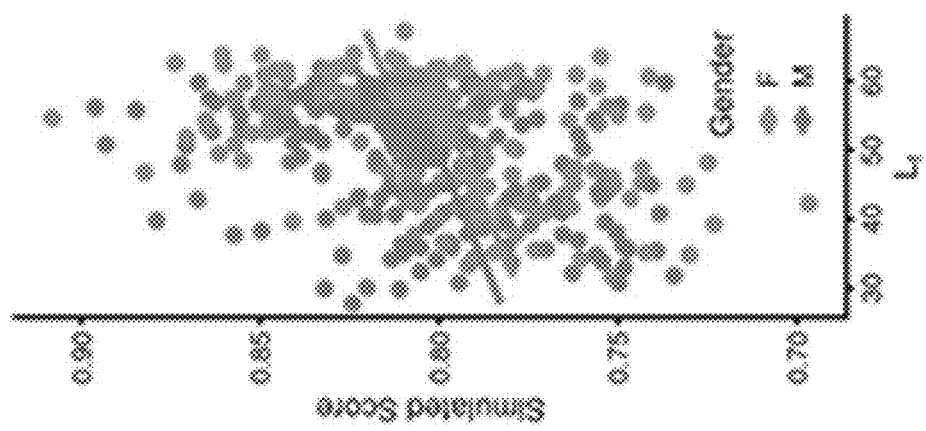
FIGS. 5A-5C show model selection and parameter estimation is affected by level of control in phenotype estimation.

Poor phenotype estimation, such as measuring skin tone from uncontrolled images (Sections IV-A and IV-B) can have substantial impacts on experimental outcomes. To illustrate this point, a computer may be programmed to execute a linear modelling experiment. Linear modelling experiments area common way to analyze the relationship between demographic variables and biometric scores [6], [43], [44]. The experiment first generated simulated biometric similarity scores according to Equation (1), for each subject in our dataset. Simulated, as opposed to real, similarity scores were used so the relationship between the input and output variables was precise and well-known. Note, those output variables, for a given subject i are i's gender, age, and their ground-truth FALM as recorded by the colormeter. To generate these scores, the intercept $\beta 0$ was set to 0.8, each continuous demographic variable was z-transformed, all effect sizes (31, 32, and 33) were set to 0.01, and the noise term was drawn from a normal distribution as $\epsilon$~N($\mu$=0,$\sigma$=0.03). Critically, these scores, visualized in FIG. 5A, are not a function of the subject's race.

$$S_{i,GT} \sim \beta_0 + \beta_1 gender_i + \beta_2 age_i + \beta_3 L_{f,a=GT,i} + \epsilon_i$$

We then constructed a different model that allowed for the possibility of score being a function of a subject's race, as shown in Equation (2). This model used the FALM values from our different datasets $\alpha$ ($\alpha \in A$, see Table II). Estimation of model parameters R was performed using ordinary least squares (OLS) to fit 1,000 bootstrap replicates of the data. Each replicate resampled 345 subjects from the population with replacement. The simulated similarity score noise c in Equation (2) was drawn separately for each replicate. Also, for each replicate, the optimal model was selected that minimizes the Akaike Information Criteria, AIC=2k-2 ln (L^), where k represents the number of estimated parameters in the model and L^ represents the maximum value of the model's fitted likelihood. AIC measures the goodness of fit of the model while discouraging over-fitting with a penalty for increasing the number of model parameters $\kappa$. To find the optimal models, we used a step wise procedure in both directions. This procedure resulted in a total 1,000 optimal models for each of our FALM datasets $\alpha$.

$$S_{i,a} \sim \beta_0 + \beta_1 gender_i + \beta_2 age_i + \beta_3 L_{f,a,i} + \beta_4 \tau ace_i + \epsilon_i \qquad \text{Equation 2}$$

Figure 5B:
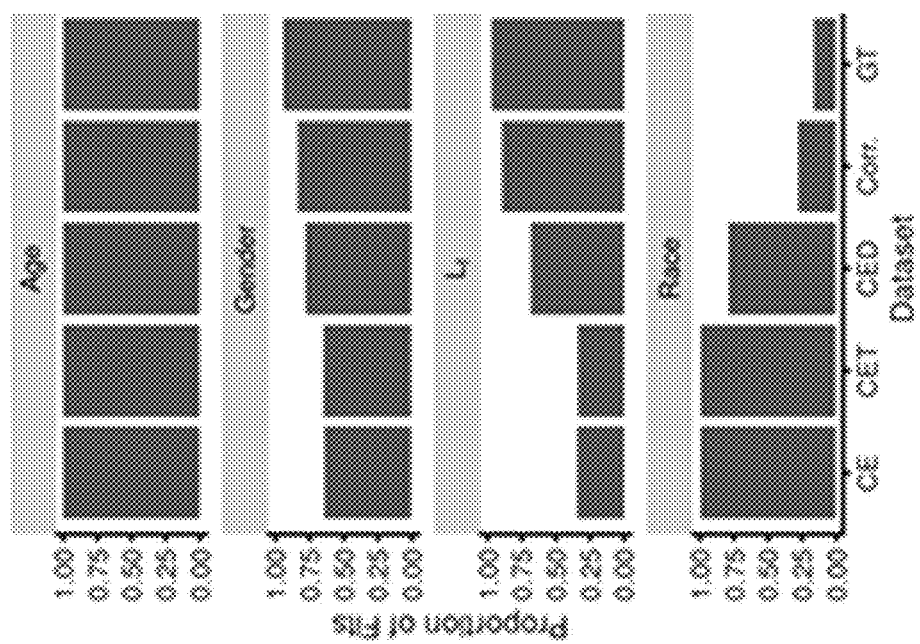
Figure 5C:
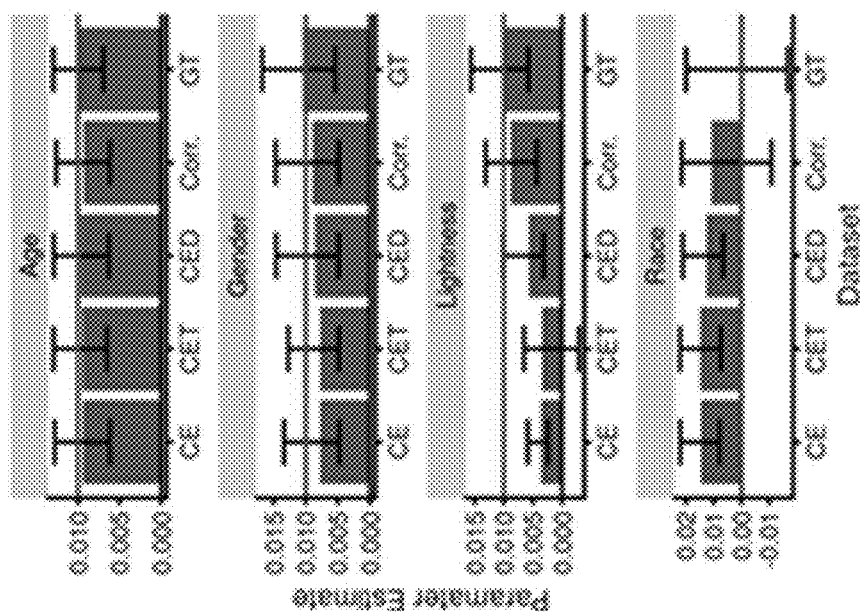

When using ground-truth FALMs as measured by the colormeter as $L_f$ in Equation (2), virtually all (97.2%) of the optimal model fits included lightness and only 16.5% made the type II error of including race (FIG. 5B). The average parameter estimate for lightness in these models correctly reflected the strength of the simulated relationship. However, in the models selecting race, the associated parameter estimate was, on average, negligible (FIG. 5C). As expected, this shows that linear models that include ground-truth FALM values are very likely to indicate, correctly, that age, gender, and lightness are related to score, all with appropriate parameter estimates whereas the relationship between race and score is absent or negligible in most models.

On the other hand, models fit using FALM estimates from the poorly controlled CE dataset, led to a vastly different outcome. Almost all (99.6%) of these models included race in the optimal model as compared to only 29.2% selecting lightless $L_f$(FIG. 5B). Further, the parameter estimate for $L_f$ in these models was far lower (0.003) than the true relationship between ground-truth FALMs and score we simulated (0.01, FIG. 5C). This shows that linear models based on poorly measured FALM values are likely to lead to an incorrect interpretation of the relevant demographic factors, selecting age, gender, and race, but not measured lightness as related to score. This overestimates the impact of these demographic variables and entirely misses or under-estimates the impact of FALM on score. Repeating this process for other datasets shows that the likelihood of a correct interpretation increases with increased level of acquisition control in the images from which FALMs are calculated (FIG. 5B-C). Thus, poor control in estimates of face phenotypes can lead to significant errors of interpretation regarding the significance of race categories in studies of biometric performance.

Section V

The feasibility of correctly quantifying an individual's face skin properties from a photograph was explored. Ground-truth face area lightness measures (FALMs) from a calibrated dermographic instrument known as a colormeter was collected. Ground-truth FALMS were compared to FALMs assessed from an assortment of face photos. Intra-subject FALMs assessed from photos can vary greatly from image to image, three times more than the average difference in ground-truth FALMs observed between the two race groups in our study (White and Black or African-American). This intra-subject variation was present to similar degree in the NIST MEDS dataset commonly used in biometric performance assessment and is likely present in all computer vision datasets of humans where acquisition conditions are uncontrolled. A measure that varies more within subject than it does between subject groups is a poor descriptor of the properties of the subject relative to the group. There is strong evidence that skin tone for use in evaluations of computer vision applications should not be ascertained from images captured in an uncontrolled environment or scraped off the Web.

It is possible to obtain reliable estimates of skin tone from some images. Prior work has used face images acquired by a single device under constant conditions to measure relative skin reflectance after correcting for a neutral grey background present in the images [6]. FALMs estimated from images and using such corrections correlated strongly ($\rho=0.92$) with ground-truth FALMs collected using the colormeter. Thus, an accurate measurement of relative skin tone can be obtained even when a calibrated skin color meter is not available.

Fitzpatrick Skin Type (FST) categories may be used to describe skin tone in images for the purpose of evaluating algorithms across this measure. This novel use of FST may be problematic for at least three reasons.

First, FST is designed to classify UV sensitivity of an individual with specific labels assigned to each category. FST is not an arbitrary ordinal scale and other ordinal scales with different category labels or a different method for arriving at these labels are not likely to produce equivalent results. FST has been shown in medical literature to be a generally unreliable estimator of skin pigmentation [17] and a specifically unreliable estimator for people of color [18], [19], [20], [21]. FST assessment is subject to inter-rater reliability issues [16] and known rater biases [13], [14], [15], most notably conflating skin tone and other features related to the race of the subject and of the rater [29]. Because of these concerns, we believe FST may be a poor choice for evaluating computer vision applications.

Second, in the medical literature, FST is arrived at by either self-report or physician accessed direct assessment. Both require access to the physical subject for whom an FST measure is being calculated. All existing computer vision work that has used FST measures has done so by having human raters judge the skin tone of subjects in images [7], [9], [10], [11], [16]. However, as this study has shown, the face image lightness of the same subject varies greatly across uncontrolled images. Because of this assessment technique, we believe it is inaccurate to even describe the arrived at quantifications in [7], [9], [10], [11], [16] as Fitzpatrick Skin Types. These studies have measured something using an image, but it was unlikely a good estimator of the FST phenotype, and is almost certainly not FST as the term is conceptualized in the medical community.

Third, even when FST types are calculated in manner supported by the medical literature, the six point self-reported FST is a poorer predictor of skin tone than even the binary race categories self-reported by the population in our study. The apparent aggregate relationship between FST and ground-truth FALMs is mainly due to different proportions of people in each race category selecting different FST values and a weak relationship between FST and ground-truth FALMs within each race category. This is strong evidence that a separate phenotypic measure should be used to assess skin properties in the assessment of computer vision algorithms generally and biometric performance in particular.

FST may be unreliable in computer vision applications, particularly with people of color. The medical community agrees with this assessment. In spite of this, if you choose to use FST classifications in an evaluation of computer vision applications, you may only arrive at FST determinations by in-person interview with a test subject. Other measures of "FST" from images of test subjects are prone to significant intra-subject, image-to-image variation in observed skin tone and are not, in fact, FST. In general, when using an ordinal scale to classify skin properties, changing the survey instrument or changing the assigned categories changes the scale. Care should be taken to explain how new scales were developed and validated before they are used in scientific studies. The FST ordinal scale may be a poor descriptor of skin tone and should not be used as such in evaluations of computer vision applications.

Poor estimates of skin tone can lead to significant errors in interpretation of linear models relating demographic variables to biometric performance, a finding that is likely true of phenotypic measures in general. Ground-truth FALMs from the colormeter was strongly correlated with race. When FALMs measured from images were used in a model fitting exercise, race replaced lightness in optimal models of simulated biometric performance even when simulated performance was not actually related to race. This indicates that studies of demographic effects on performance should either a priori determine which correlated variables (e.g., race or lightness) should be used in modelling or be cautious in their interpretation of the optimal model. Minimizing error in measurement of phenotypes is necessary to avoid confusion between phenotypes and any correlated demographic groups.

Figure 6:
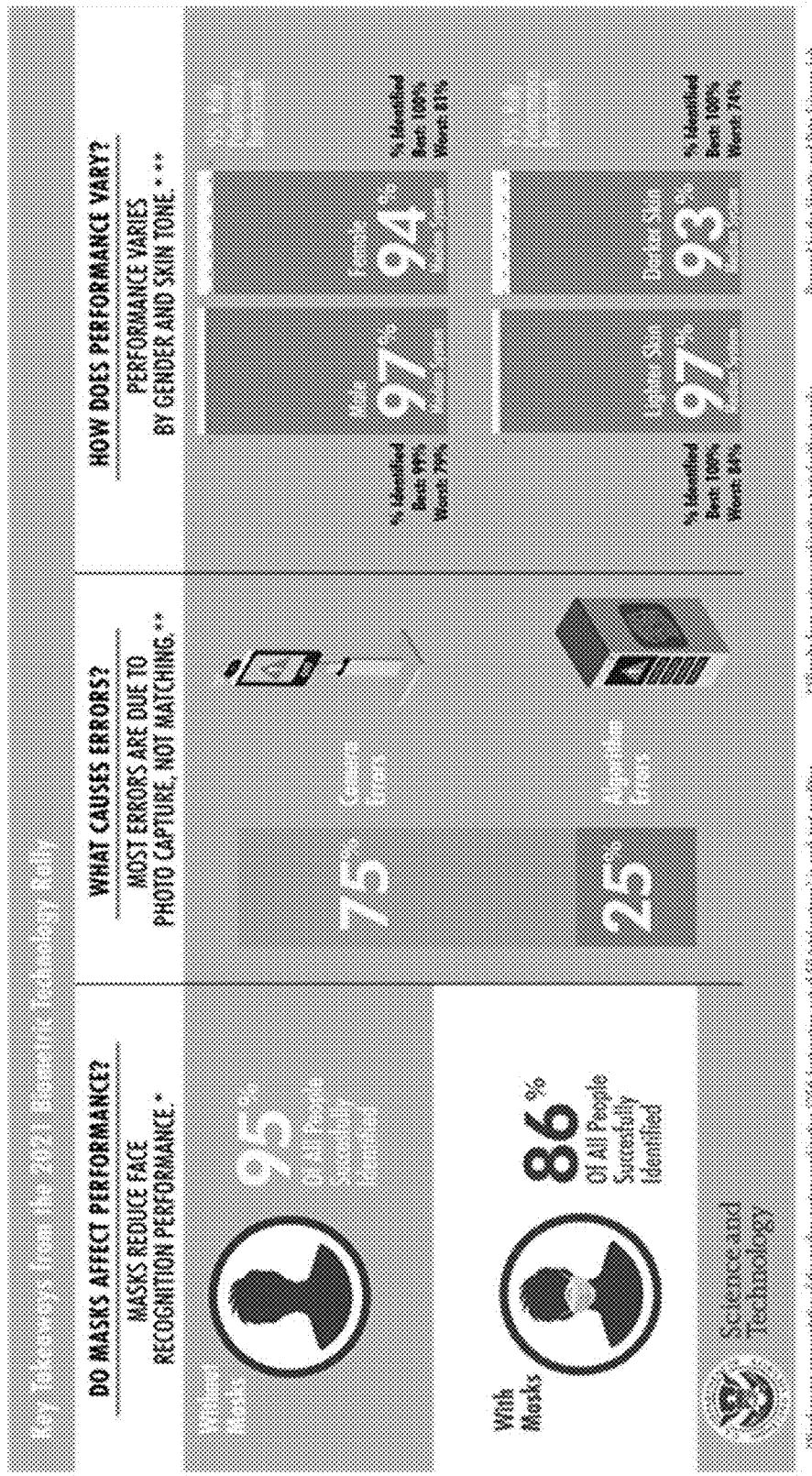
FIG. 6 shows some statistical results of computer-vision systems that took place at the 2021 Biometric Technology Rally.

FIG. 6 shows some statistical results of computer-vision systems that took place at the 2021 Biometric Technology Rally. While some systems identified both men and women with a 100% accuracy, the median is still lower than optimal. Moreover, camera errors continues to be the largest source of error in identification systems. Also, identification systems continue to struggle identifying people of color. Of course, all systems had more difficulty in identifying people with face masks.

Figure 7:
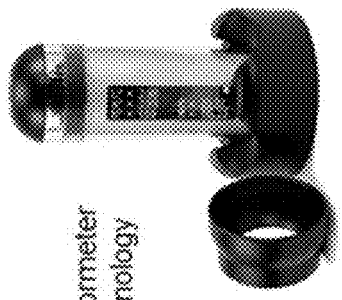
FIG. 7 shows how a schematic of measuring skin tone using an MdTF.
Figure 7:
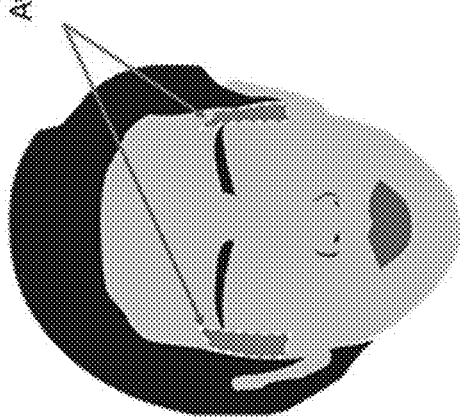

FIG. 7 shows how a schematic of measuring skin tone using taken at the MdTF.

Face skin tone: measured "natural" range. ISO/IEC 29794-5 (WD5) defines "unnatural color" as a component of face image quality. MdTF samples collected by the Applicant suggest a "natural" skin tone range can be found as shown in Table 4.

Figure 8:
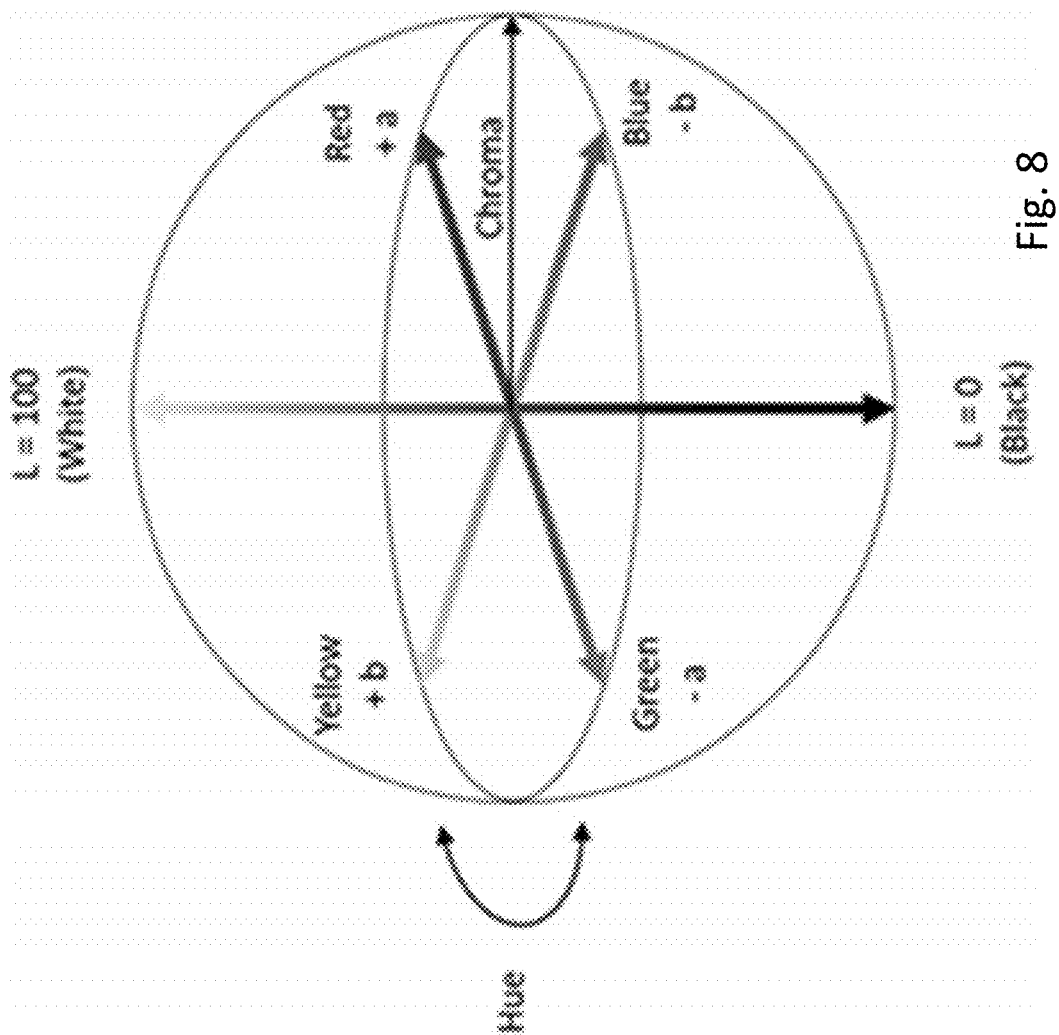
FIG. 8 shows equations and a graphical representation of distances in CIELAB colorspace—normalized for human perception.

FIG. 8 shows equations and a graphical representation of distances in CIELAB colorspace—normalized for human perception.

$$\Delta E = \sqrt{((\Delta L)^2 + (\Delta a)^2 + (\Delta b)^2)} \quad \text{Equation 3:}$$

$\Delta E = 2.3$ is a just-noticeable difference in human perception.

Hue and chromaticity are an intuitive means of describing color:

Hue=180/π atan (b/a)
Chromaticity=√(a^2+b^2)

Figure 9A:
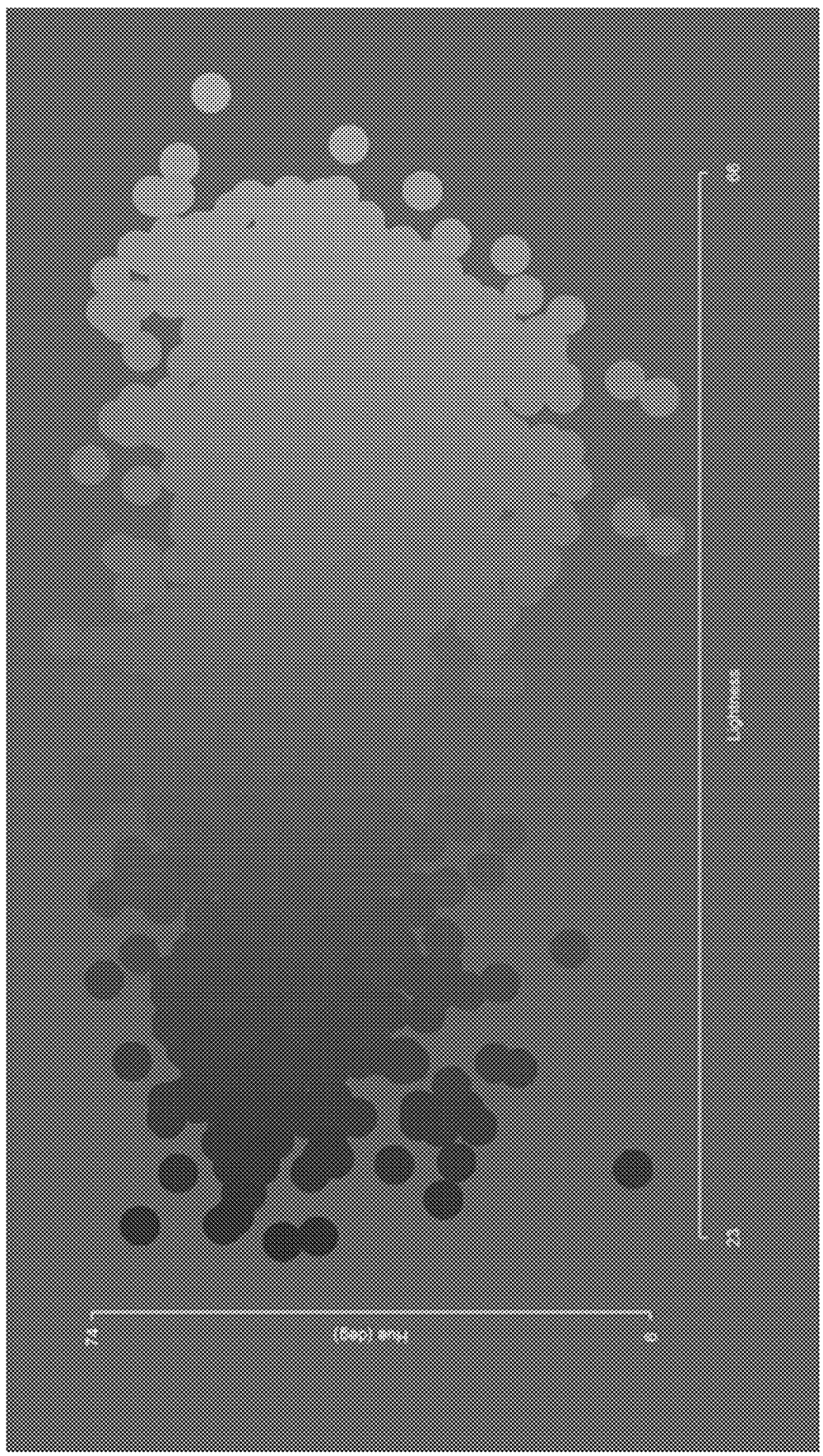
FIGS. 9A-9E shows a graphs of skin color for different ethnicities as function of Hue vs Lightness.
Figure 9B:
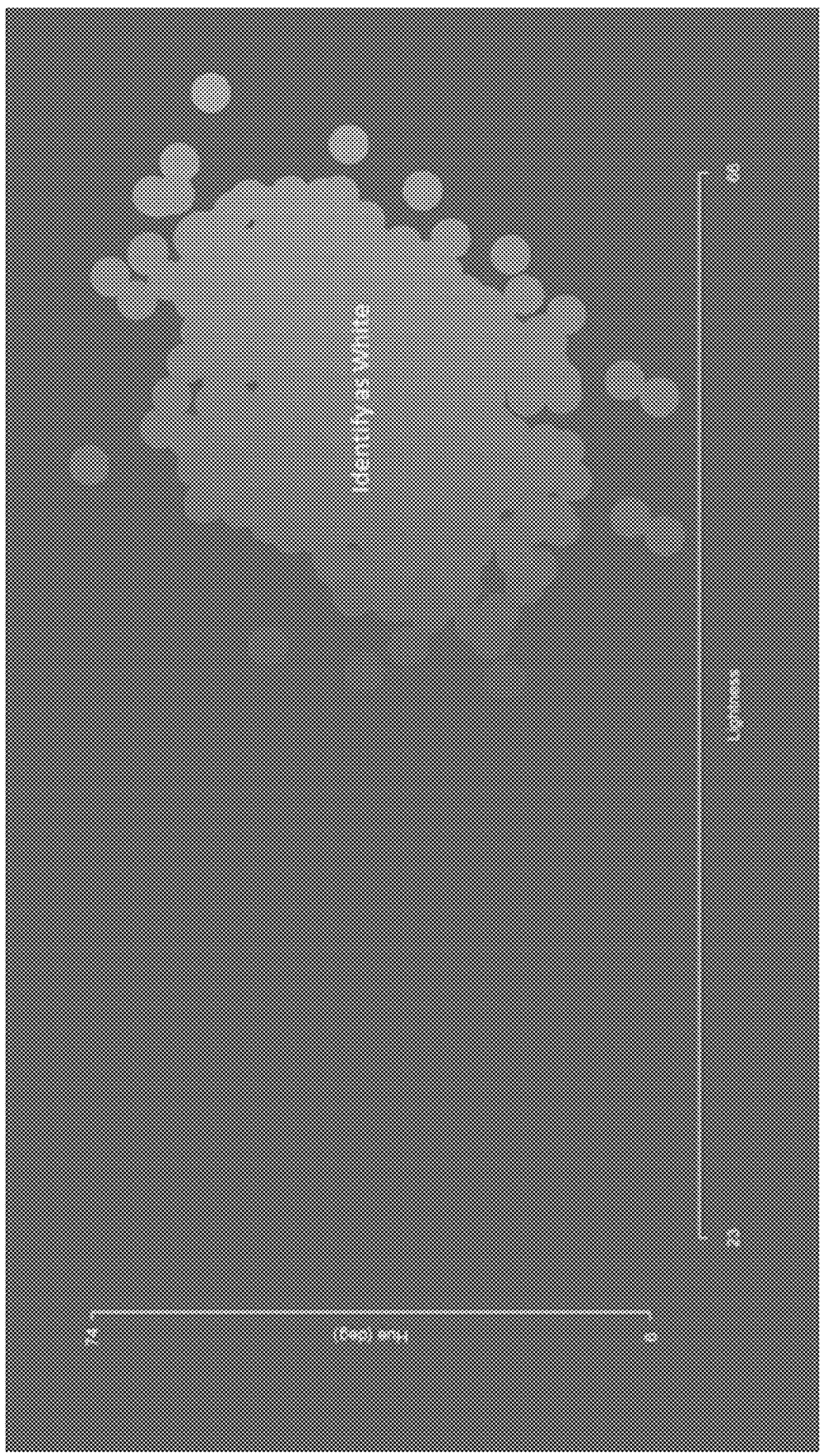
Figure 9C:
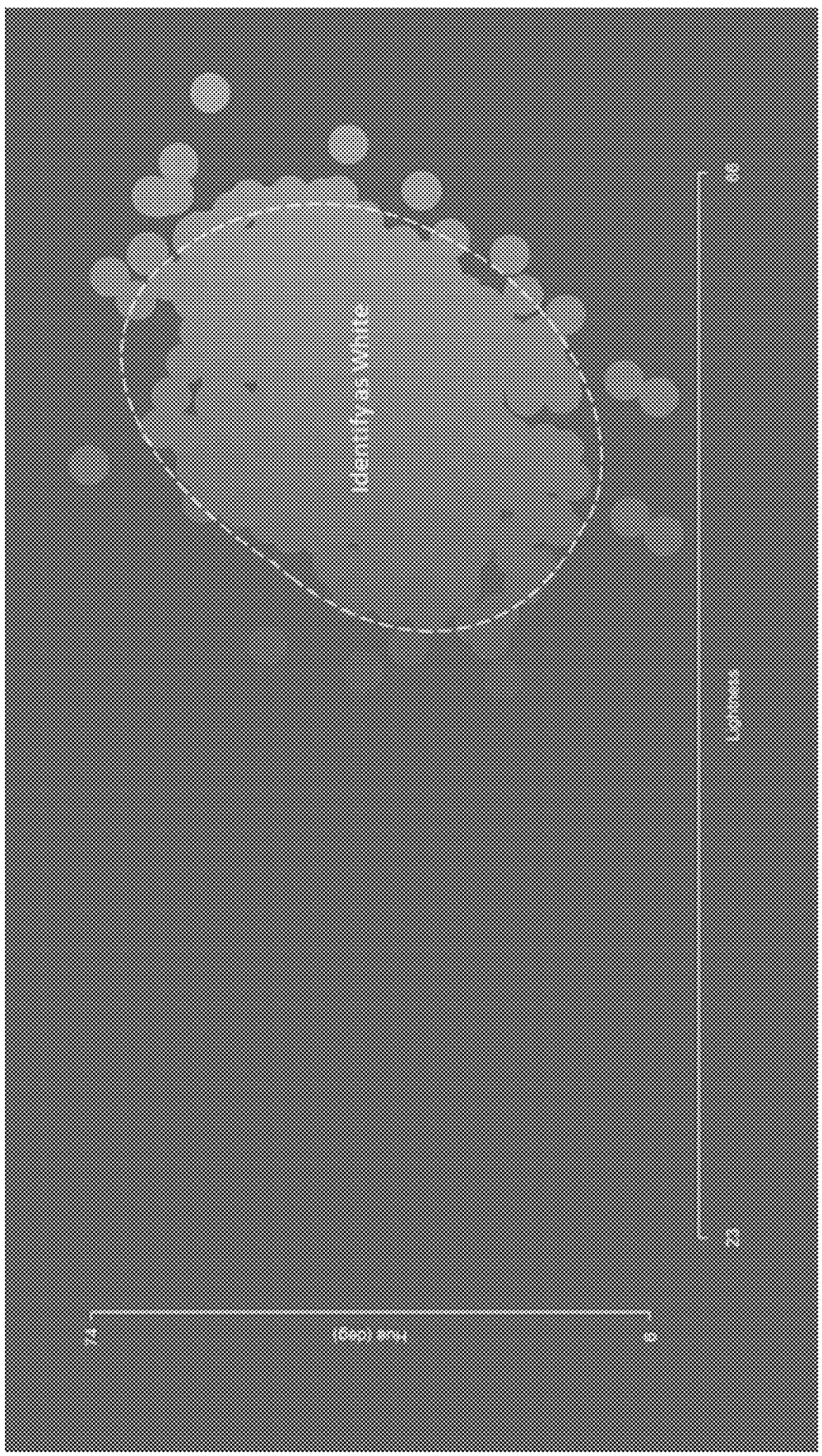
Figure 9D:
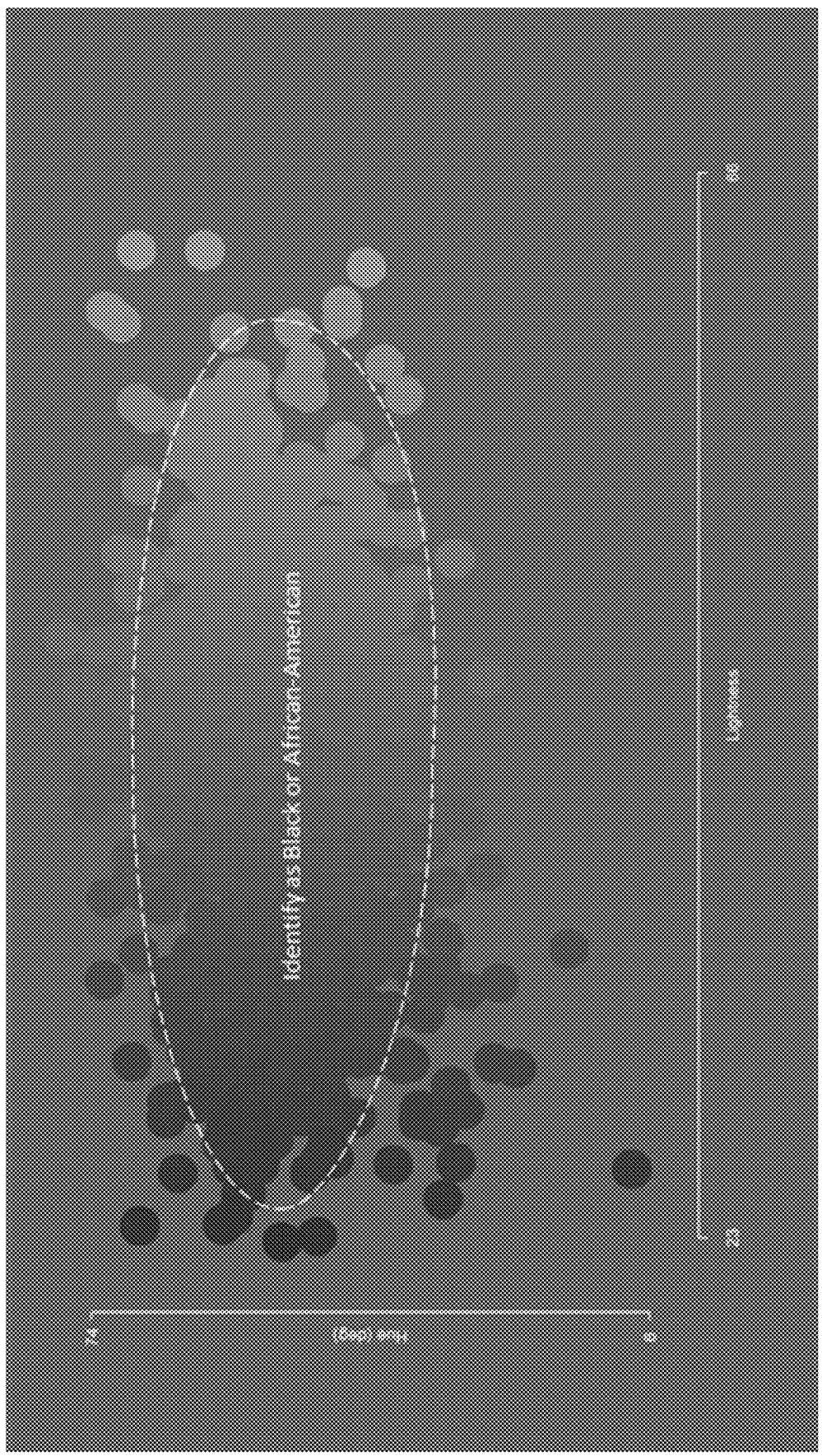
Figure 9E:
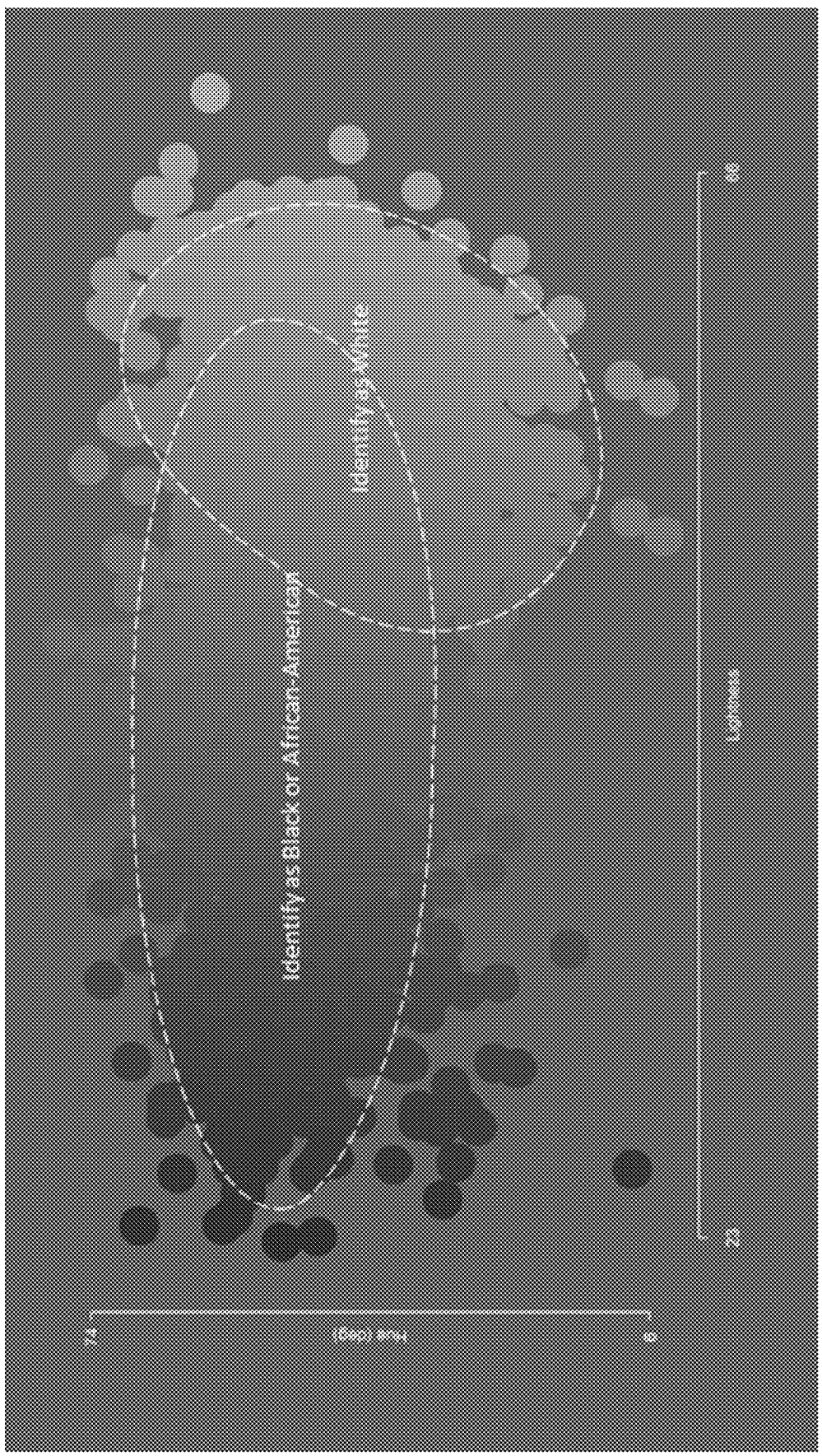

FIGS. 9A-9E shows a graphs of skin color for different ethnicities as function of Hue vs Lightness. FIG. 9A shows all ethnicities. FIG. 9B shows a graph of hue and lightness skin tone for people that identify as White. FIG. 9C shows a graph of hue and lightness skin tone for people that identify as Black or African American. FIG. 9 shows a graph of hue and lightness skin tone for people that identify as Black or African American and White with an overlapping area identified.

TABLE 4

A "natural" skin tone in range can be defined as:
a range of values in MdTF sample

| Lightness: | 23-66 |
| a*: | 5-26 (avg = 15) |
| b*: | 2-28 (avg = 16) |
| Hue: | 6-74 degrees |
| Chromaticity: | 10-32 |

Figure 10:
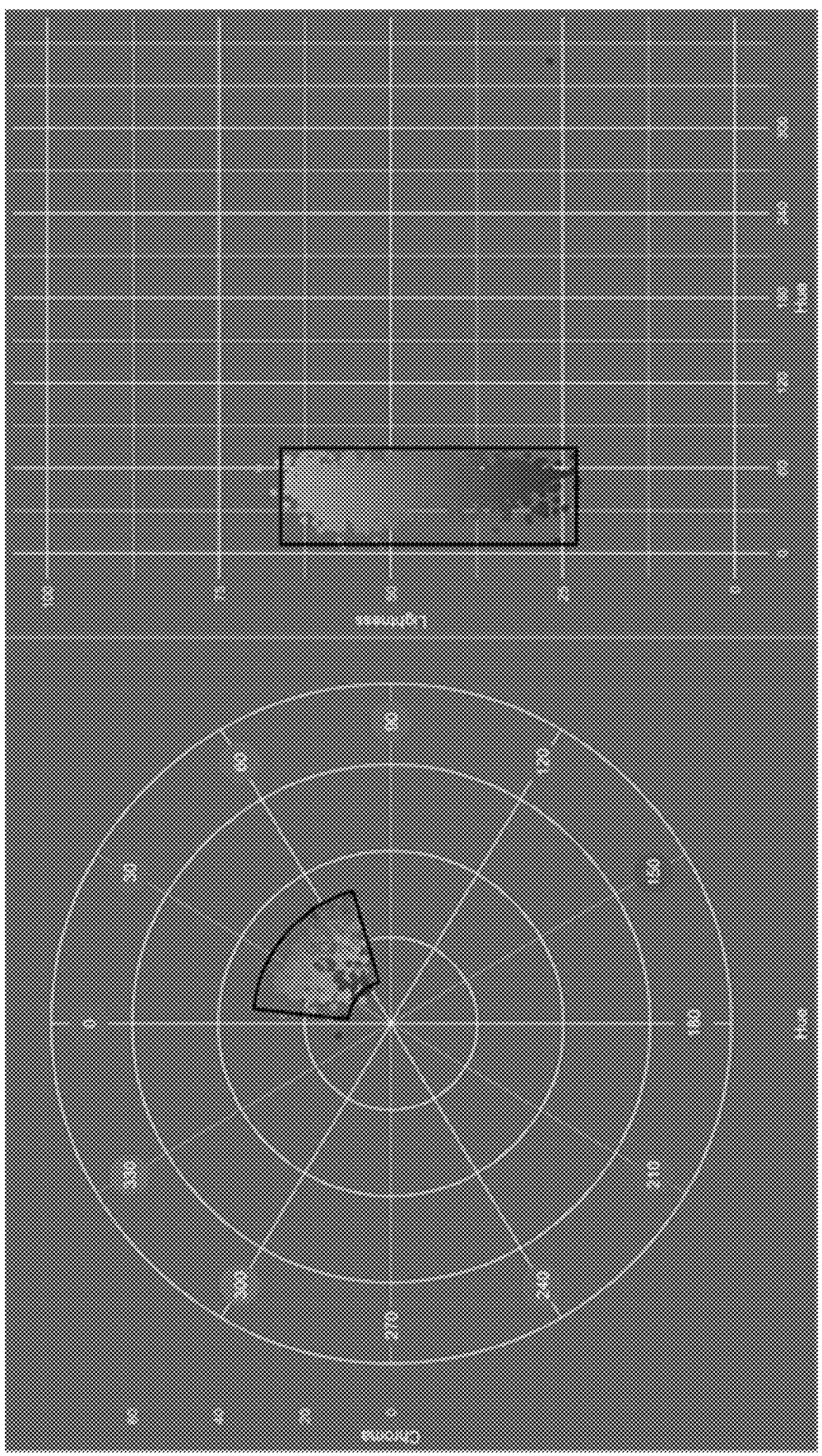
FIG. 10 shows hue for various skin tones plotted on a polar graph.

FIG. 10 shows hue for various skin tones plotted on a polar graph.

Figure 11:
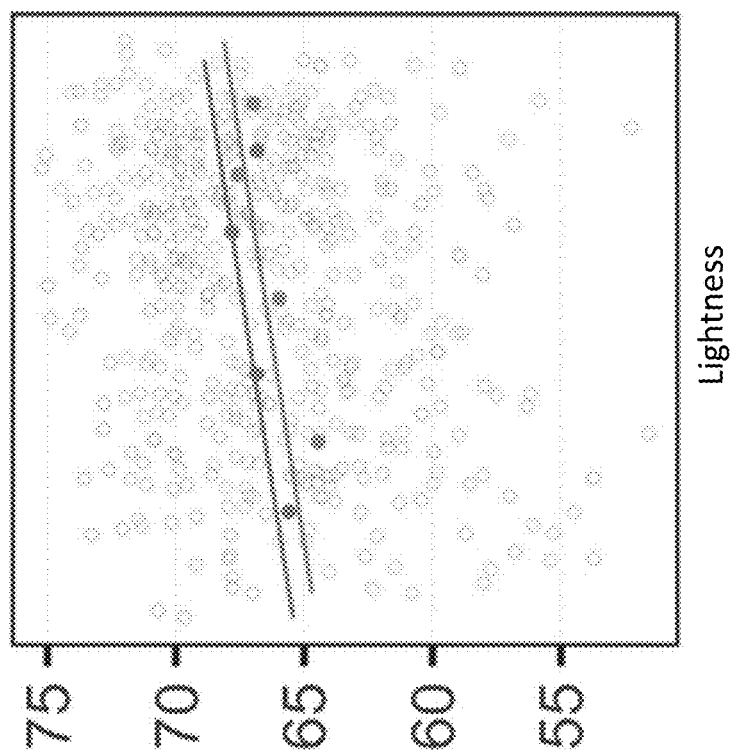
FIG. 11 shows a graph illustration a relation biometric system performance.

FIG. 11 shows a graph illustration a relation biometric system performance.

Acquisition:
Failure to Acquire is greater for volunteers with darker skin tone.

Matching:
Rank one mated scores are higher for those with lighter skin tone (Cook et al., TBIOM 2018)
True for >50% of acquisition-matching system combinations tested in DHS S&T Rallies (85 of 158)
Relation of scores with skin tone is stronger than with Race
Relation of scores with skin tone exists for volunteers identifying as Black or African-American, but not for those that identify as White.
Relationship between skin tone and mated score can vary across acquisition systems.

Some of these effects may be due to poor quality of acquired imagery.

Figure 12:
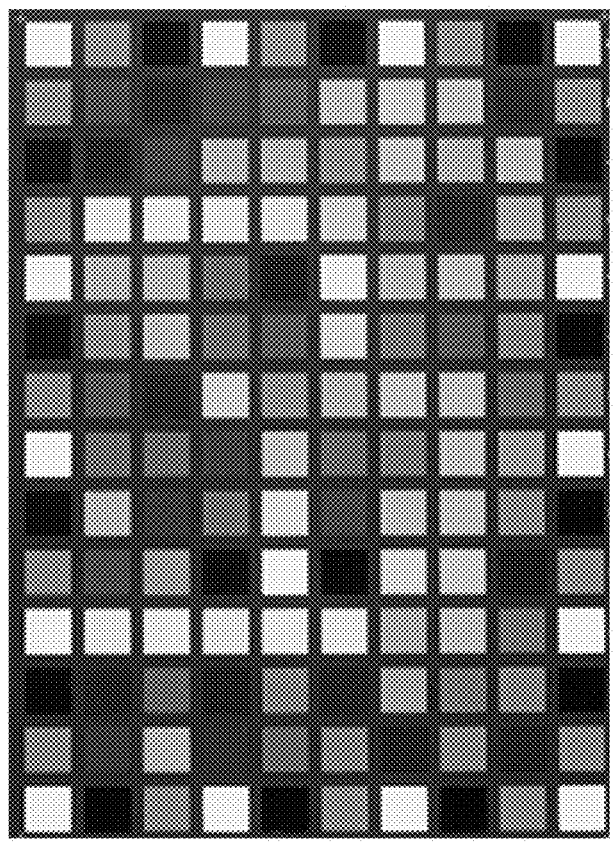
FIG. 12 shows CIELAB Values for color calibrating cameras.
Figure 12:
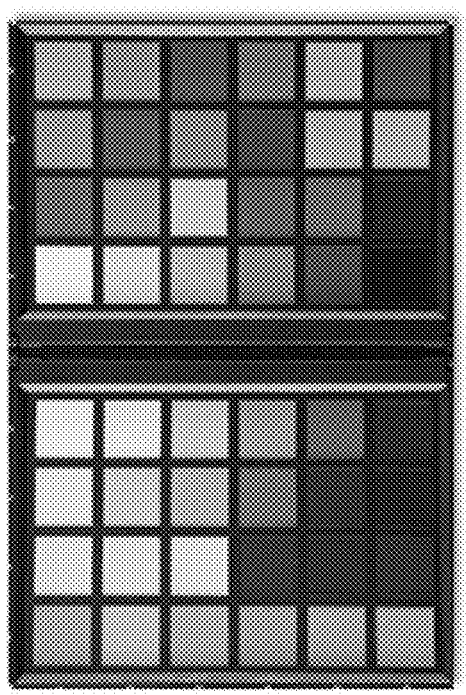

FIG. 12 shows CIELAB Value for color calibrating cameras. CIELAB values are provided for each color element in these colorcheckers.

Figure 13A:
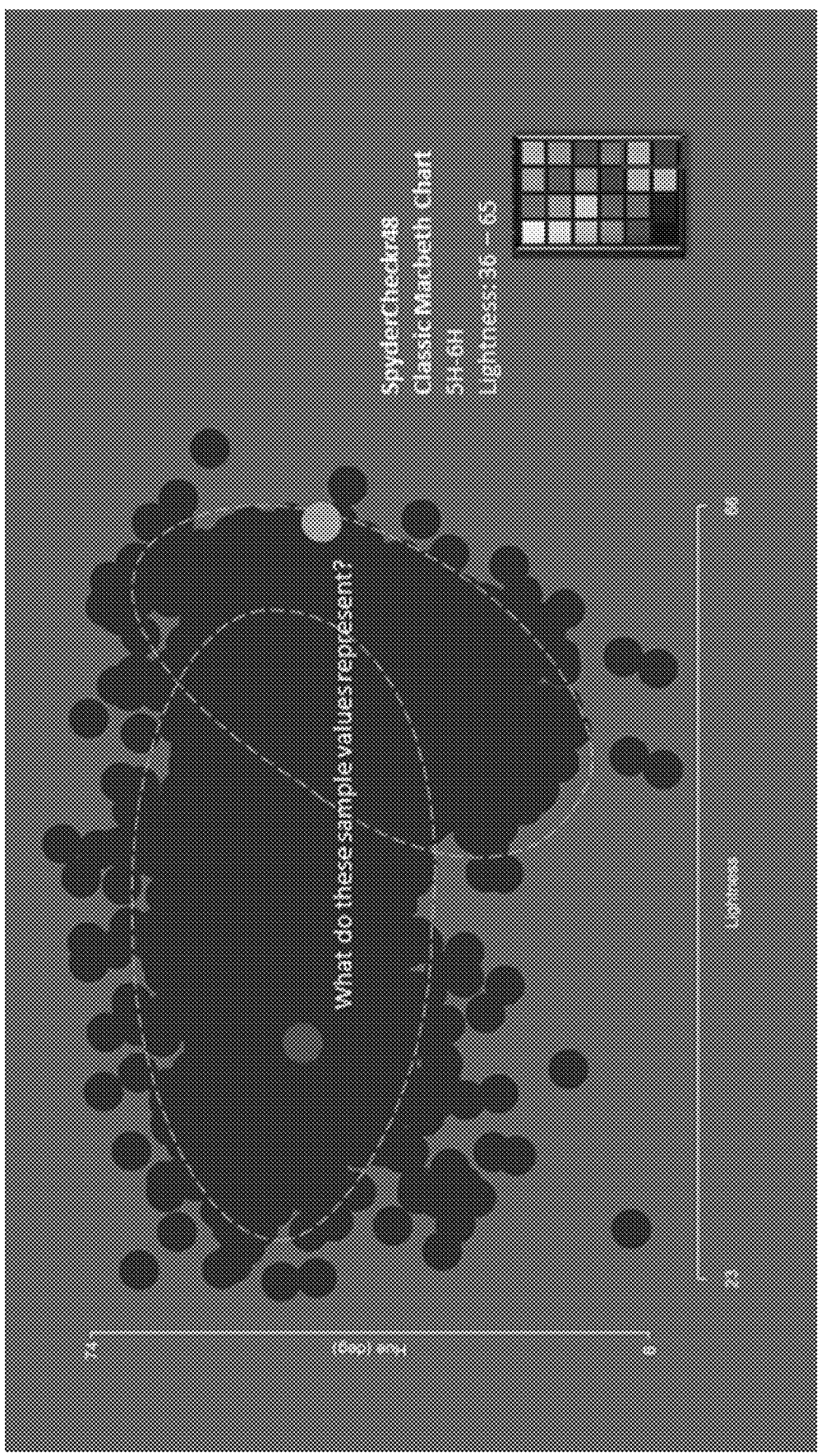
FIGS. 13A-E shows comparisons of colorcheckers and measured values.
Figure 13B:
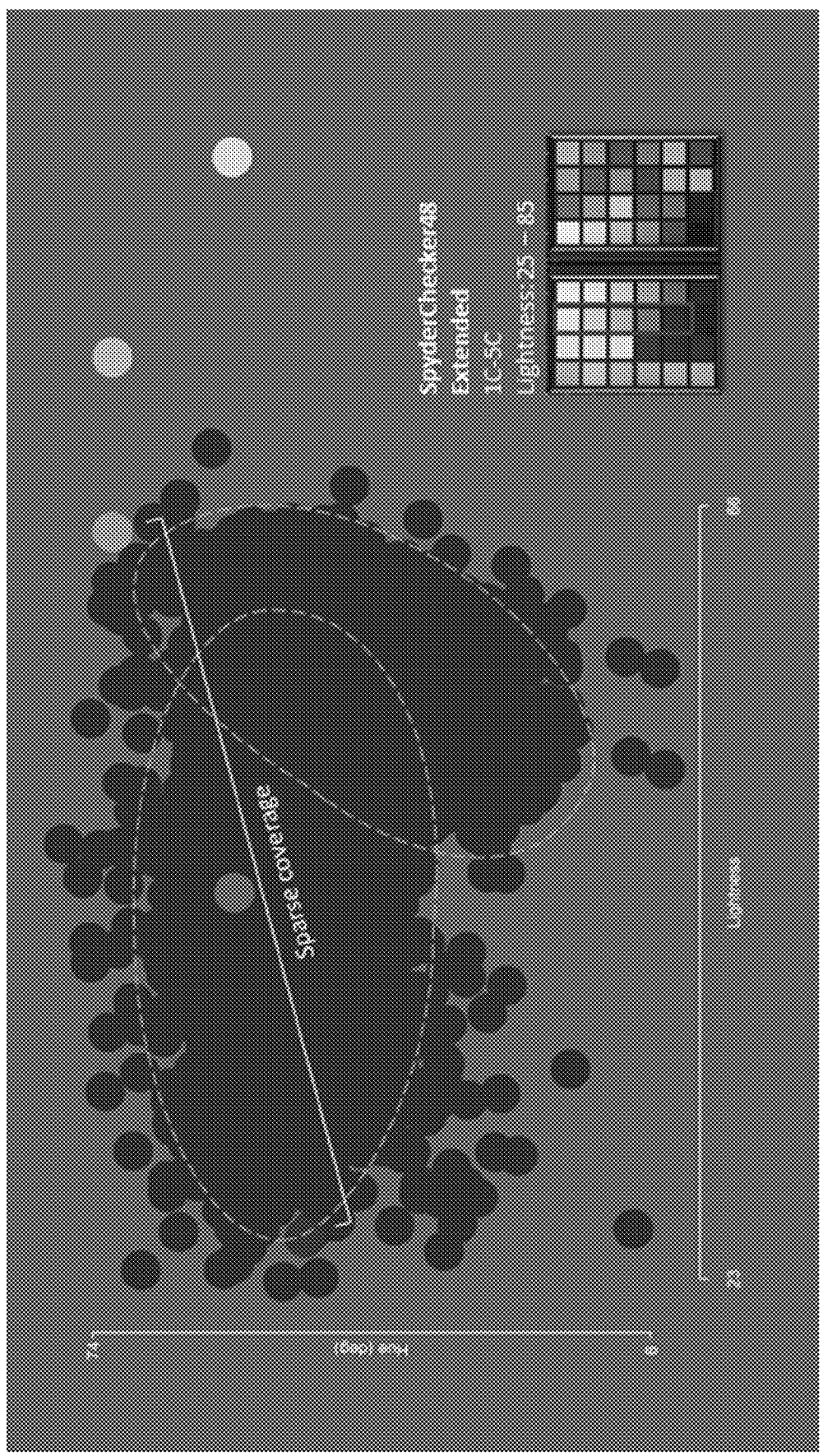
Figure 13C:
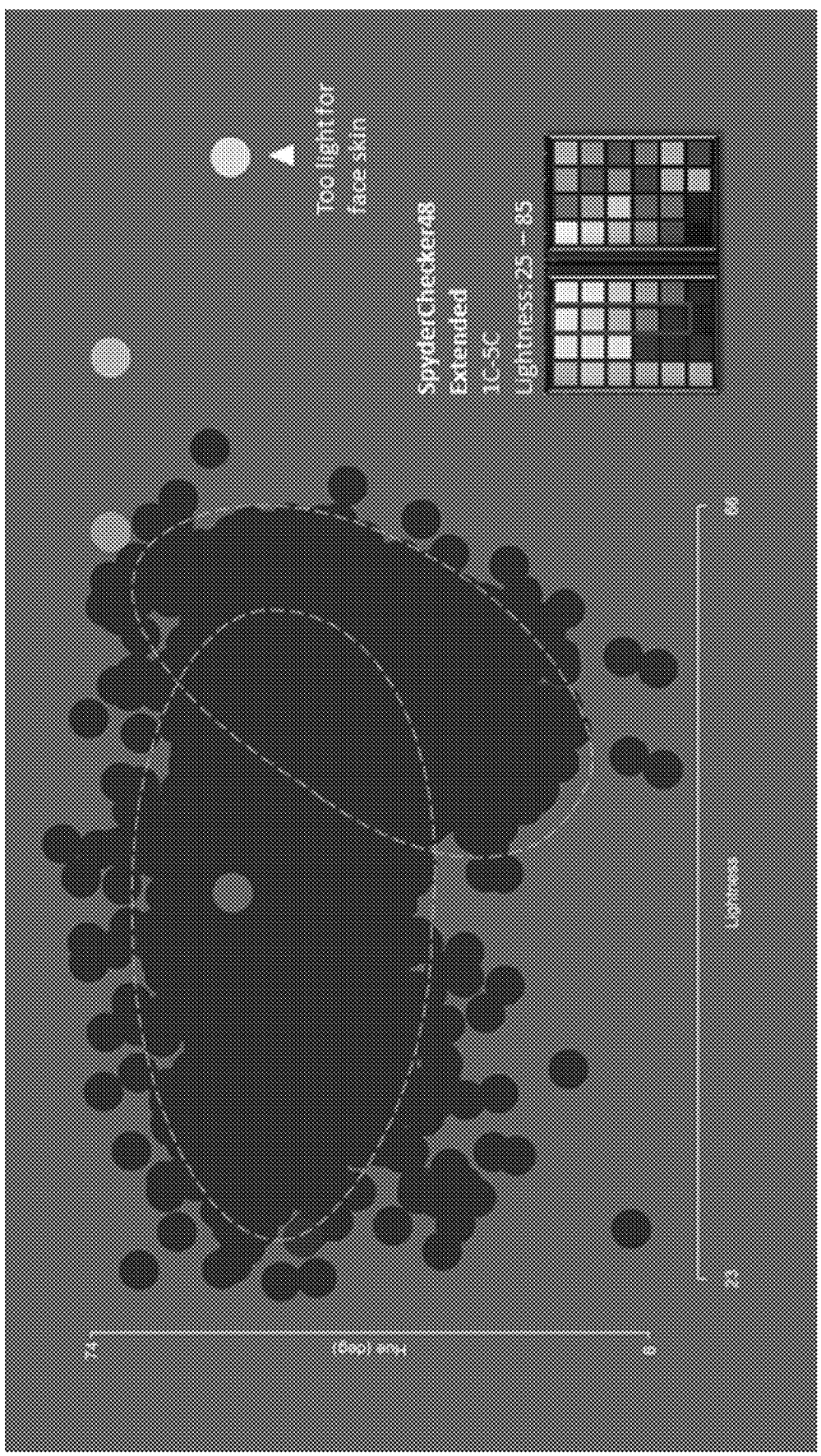
Figure 13D:
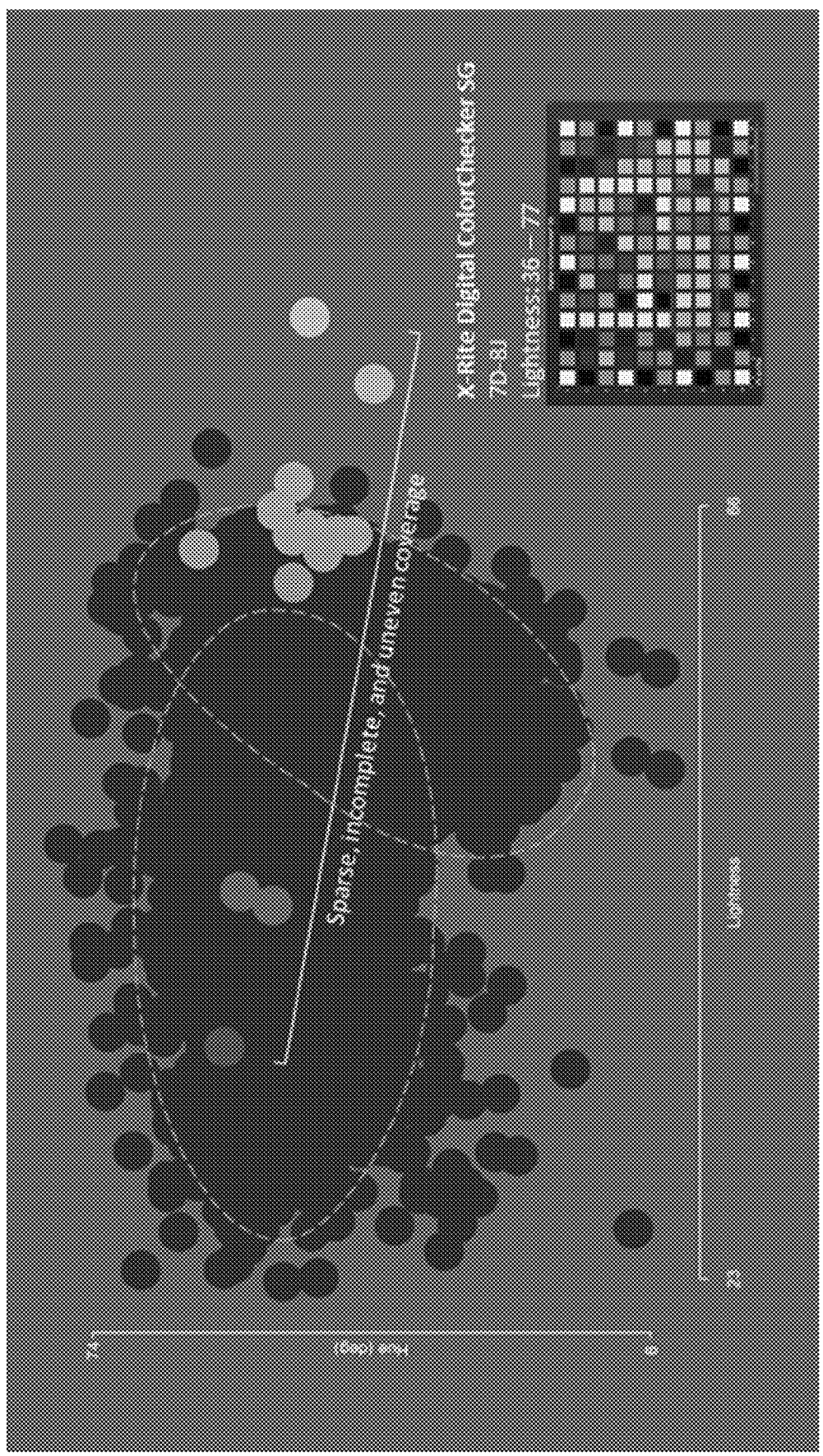
Figure 13E:
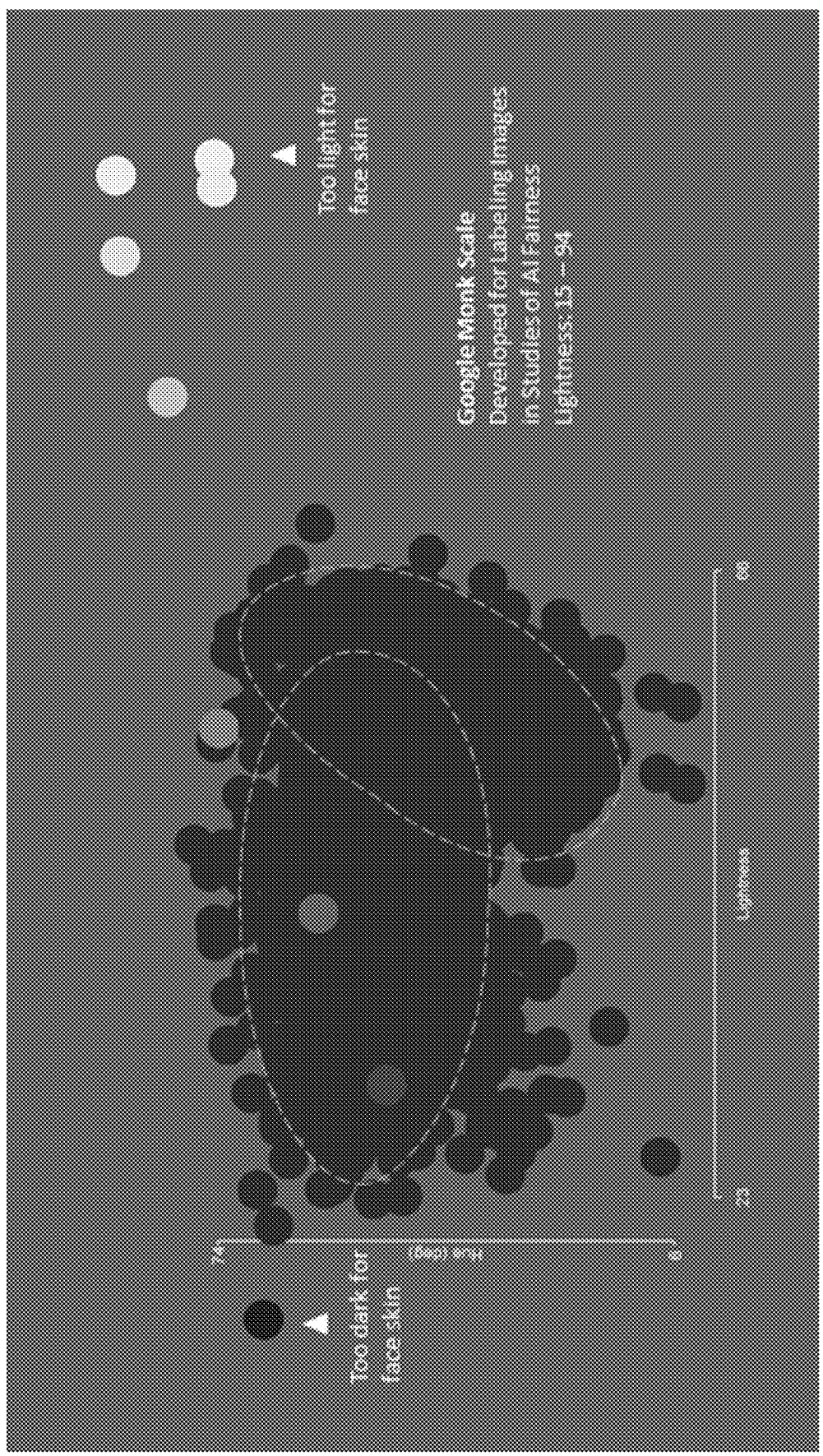
Figure 13F:
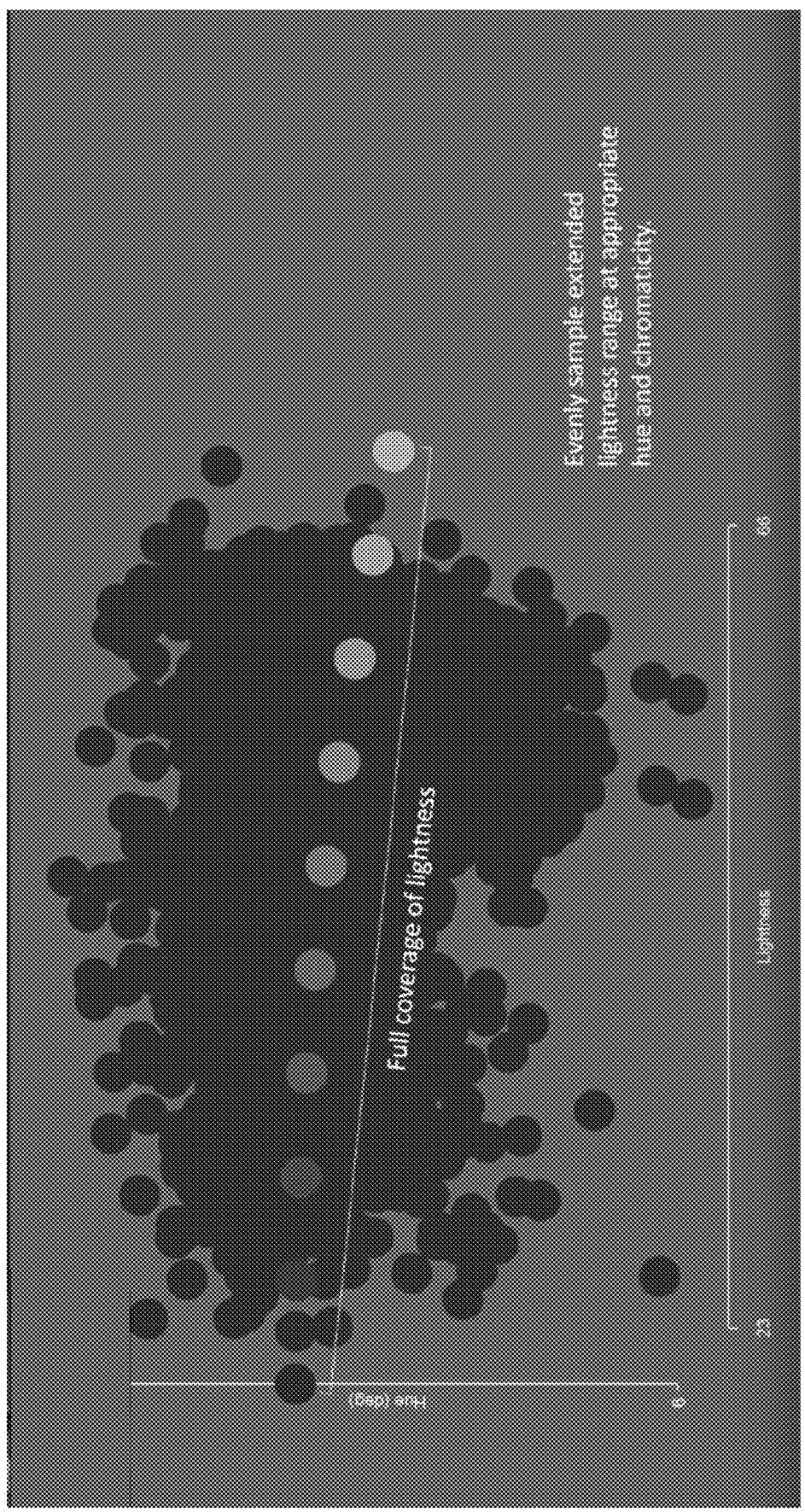
FIG. 13F shows an evenly distributed color space range from collected face data sets.

FIG. 13A shows two CIELAB colors and their mapping on a hue/lightness graph for skin tone. From the colorchecker (classic MacBeth chart) there were only two colors that correspond to skin color (e.g. blue is not a skin tone color.) FIG. 13B illustrates there is sparse coverage on a Spyder Check 48 colorchecker for various skin tones, and many of the skin tones are outside the "natural" range of skin color measured at the MdTF. FIG. 13C shows a point that is considered too light for face skin. FIG. 13D shows that the X-Rite Digital ColorChecker has sparse, incomplete, and uneven coverage for various skins tones. Most of the colored squares associated with skin color are too light relative to actual skin color. FIG. 13E shows points outside the Google Monk Scale. FIG. 13F shows an evenly distributed color space range from collected face data sets. The colored circles (color swatches) in the graph could be used by the computer to generate a colorchecker comprising an evenly distributed color space for faces. Through a data-driven approach and relying on skin tone colored collected from actual people, the computer can be configured to generate a more accurate set of color swatches for a colorchecker.

Figure 14:
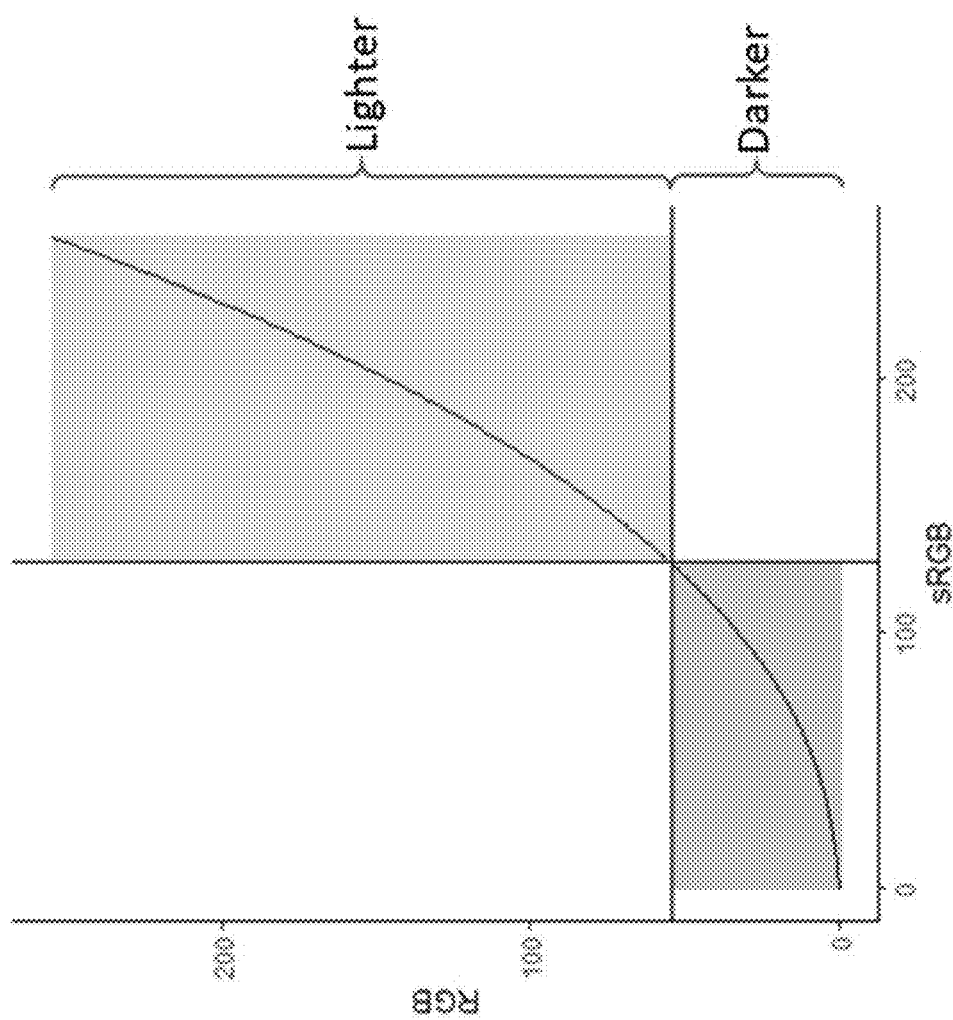
FIG. 14 shows a graph comparing RGB v sRGB

FIG. 14 shows a graph comparing RGB v sRGB. RAW camera sensor RGB response is linear. sRGB response is a non-linear transformation. What happens to darker vs. lighter values based on this transformation? sRGB differentially compresses linear sensor response. sRGB values of 0-127 correspond to linear RGB range of 0-54 (range of 128 representing 54). sRGB values of 128-255 correspond to linear RGB range of 55-255 (range of 128 representing 200). Darkest skin sample had linear RGB value of rgb (20, 7, 3). Lightest skin sample had linear RGB value of rgb (190, 164, 148). This means that the linear sensor response may preserve about 4-times more intensity information for lighter versus darker skin.

$$C_{linear} = \begin{cases} \frac{C_{srgb}}{12.92}, & C_{srgb} \leq 0.04045 \\ \left(\frac{C_{srgb} + 0.055}{1.055}\right)^{2.4}, & C_{srgb} > 0.04045 \end{cases} \quad \text{Equation 4}$$

Implications for Acquisition Systems. Face recognition systems should be able to handle variation in illumination for face samples with CIELAB color range:
Lightness: 23-66
Hue: 6-74 degrees
Chromaticity: 10-32
Can measure reproduction of CIELAB color within defined error from target $$\Delta E = \sqrt{((\Delta L)^2 + (\Delta a)^2 + (\Delta b)^2)} \quad \text{Equation 5}$$

Optimize for diffuse—not specular reflection

Implications for Face Image Datasets. Training methods to evaluate face recognition may include images having varied skin tone in images outside the natural range. Such a result may indicates dataset images that are improperly color calibrated.

A measure of face dataset "color health":

$$CH_{dataset} = 1/N \sum_{\_} (i=1)^{\wedge} N \ (c\_i \in C) \quad \text{Equation 6}$$

$$CH_{dataset} = \frac{1}{N} \sum_{i=1}^{N} c_i \in C$$

Figure 15:
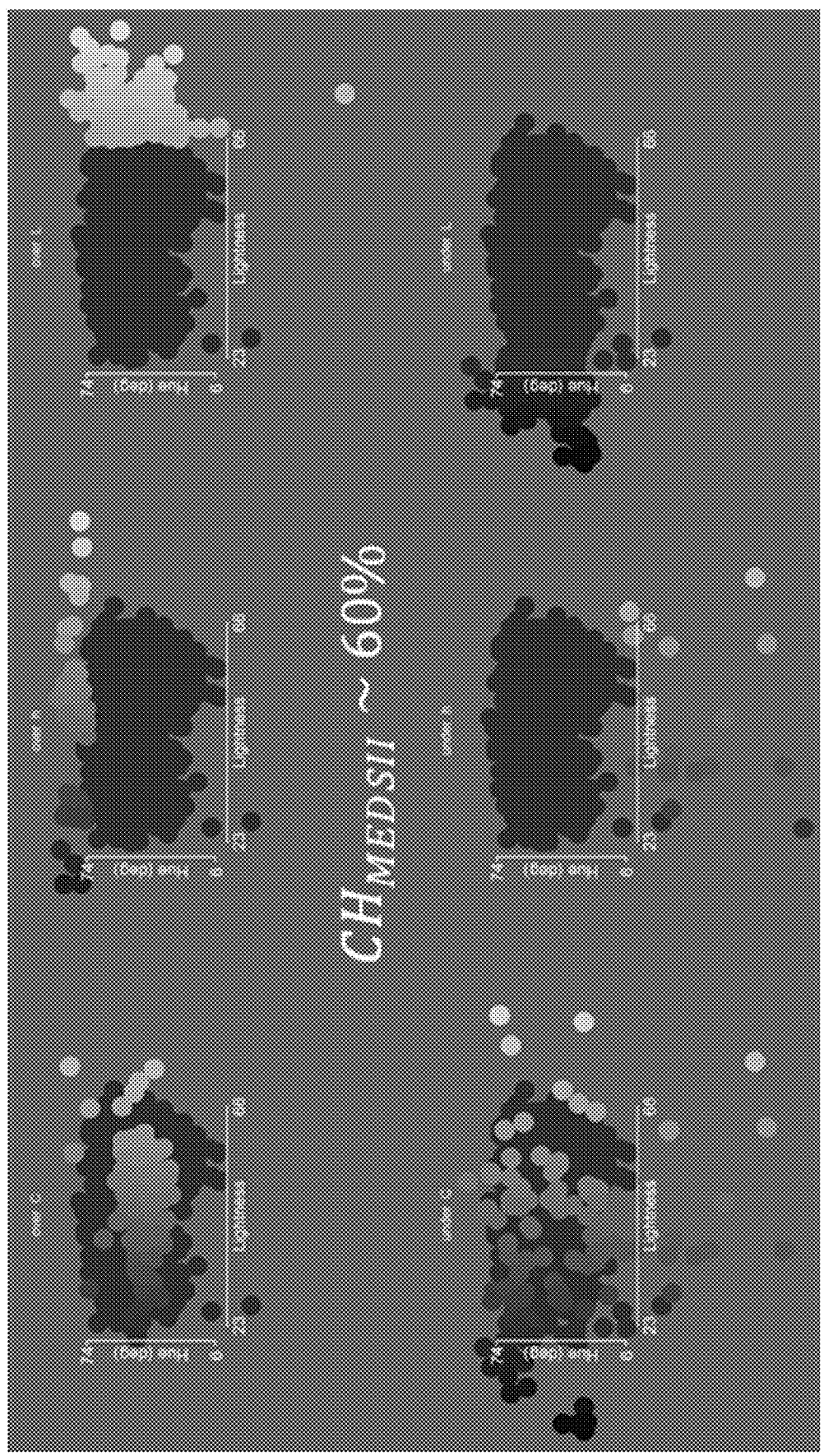
FIG. 15 shows a CIELCH for approximately 60% ($CH_{MEDSII}$).

FIG. 15 shows a CIELCH for approximately 60% ($CH_{MEDSII}$).

Figure 16:
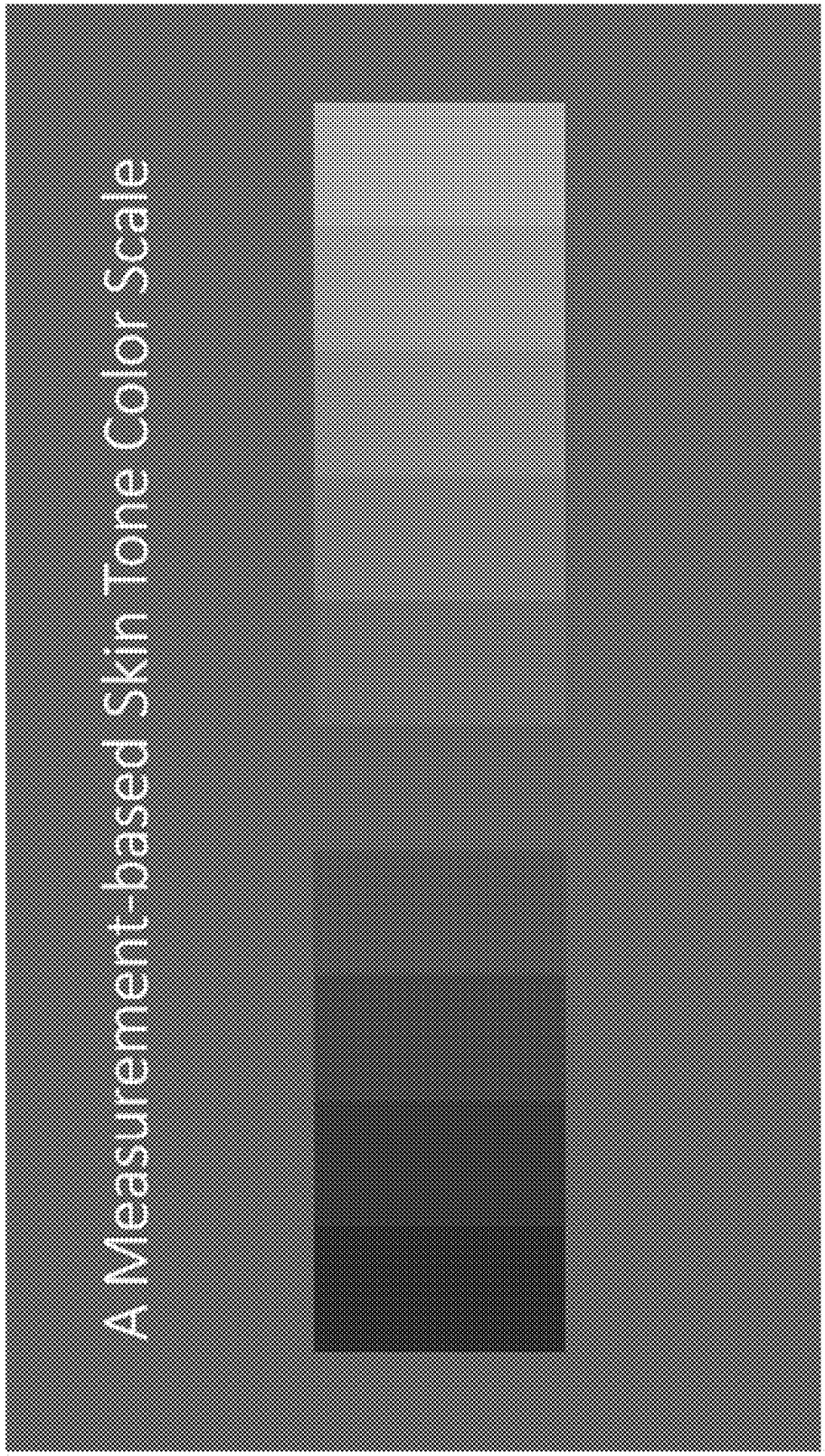
FIG. 16 shows a Measurement-based Skin Tone Color Scale.

FIG. 16 shows a Measurement-based Skin Tone Color Scale.

Example Systems and Methods

Figure 17:
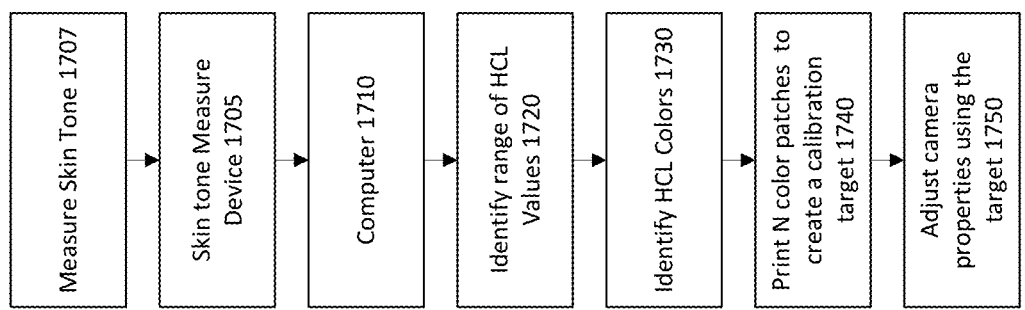
FIG. 17 shows a process flow for creating a data driven skin tone target.

FIG. 17 shows a process flow for creating a data driven skin tone target. The process flow may comprise using a skin tone measuring device 1705 to measure skin tone (or skin phenotype) across wide sample of volunteers diverse in race, gender, age 1707. The process may include providing a camera comprising camera properties associated with capturing an image. The skin tone measuring device may be connected to a computer or it may comprise a computer 1710. The computer may express the skin tone in CIELAB or CIELCH coordinates. The computer may identify a range of observed lightness, chromaticity, and hue values in the population 1720. The computer may identify a set of N colors that span the range of observed values 1730. The computer may spectrally print N color patches to create a data-driven skin tone calibration target. 1740 The computer may use the target to adjust camera properties to reliably reproduce human skin tones. The computer may generate a face data set comprising a set of images of faces. The face data set may comprise 10, 25, 50, 100, 500, 1000, 10000, or N images of faces. The faces may be of individuals in a natural distribution or random assortment of race, gender, nationality, sex, and age. The computer may contain a randomizer configured to select a subset of the face images in the data set using a randomization algorithm.

A computer may comprise a processor, memory, storage media, a motherboard, power supply, network interface, input peripherals (like a mouse and keyboard), a display, printer, etc. The computer may comprise non-transitory, computer readable code, software, and/or instructions for causing the processor to execute a series of steps or processes.

Figure 18:
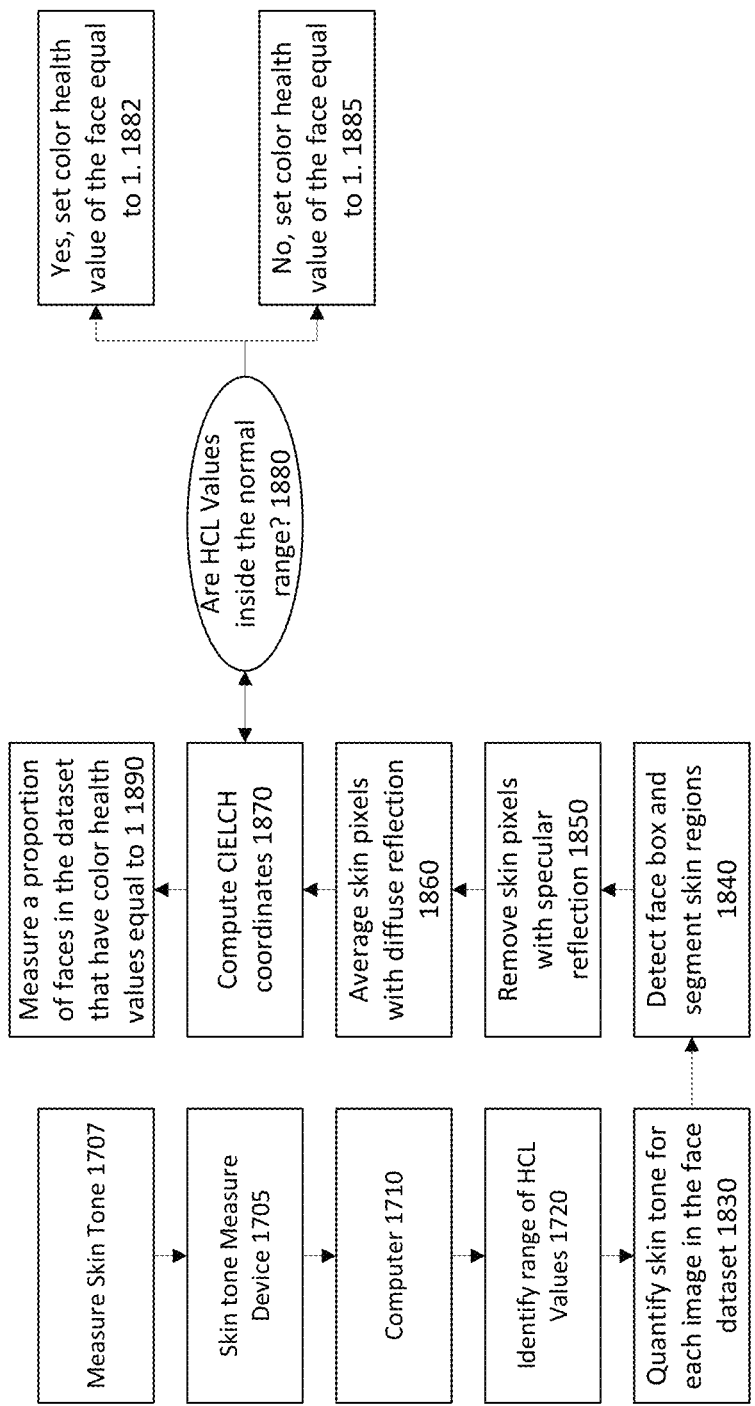
FIG. 18 shows a process flow to measure skin tone health of face dataset and color quality of a single face image.

FIG. 18 shows a process flow to measure skin tone health of face dataset and color quality of a single face image. The process flow may comprise using a skin tone measuring device 1705 to measure skin tone (or skin phenotype) across wide sample of volunteers diverse in race, gender, age 1710. The computer may express the skin tone in CIELAB or CIELCH coordinates 1715. The computer may identify a range of observed lightness, chromaticity, and hue values in the population 1720. The computer may quantify skin tone for each image in the face dataset 1830. The computer may: detect face box and segment skin regions 1840; remove skin pixels with specular reflection 1850; average skin pixels with diffuse reflection 1860; compute CIELCH coordinates (or other color coordinate system) for the face 1870. CIELCH comprises HLC values (Hue Lightness and Chromaticity). The computer may define a normal range of values for HCL. A normal range may be a range of values that fall within a predetermined or standard deviation. The normal range may comprise all measured values of HCL. If HCL values are inside the normal range 1880, the computer may set color health value of the face equal to 1 or "true" 1882. If HCL values are outside the normal range setting the color health value of the face proportional to the shortest difference in CIELAB space to the boundary of the natural color range 1885. The computer may measure a proportion of faces in the dataset that have color health values equal to 1 or "true" 1890.

Figure 19:
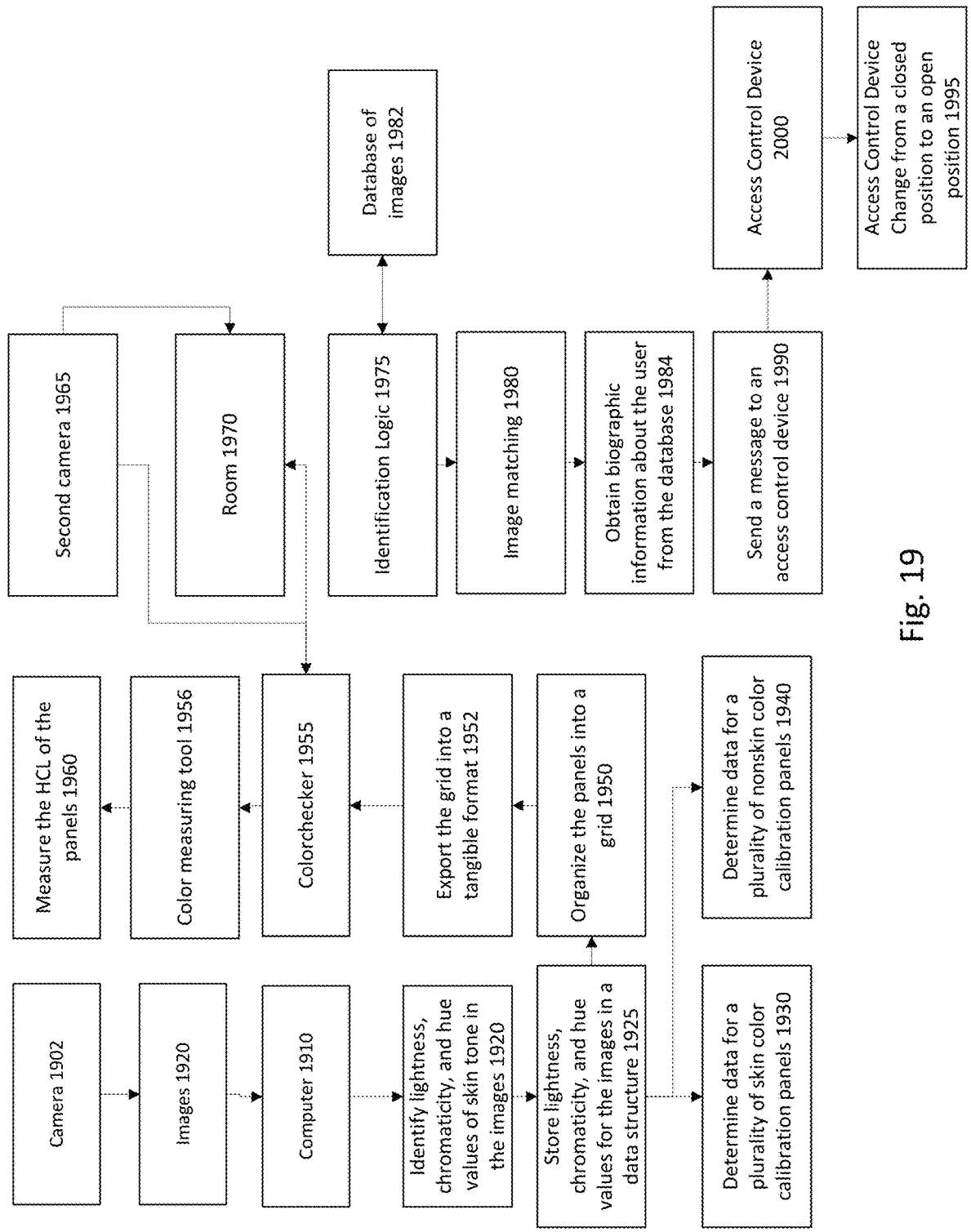
FIG. 19 shows a system for identifying a target user.

FIG. 19 shows a system for identifying a target user. The system may also be designed to determine skin tone or skin phenotype of a target user. The system may comprise a camera 1902 for capturing images of a plurality of users; the image may comprise an identifier. The system may comprise a computer 1910 configured to: identify lightness, chromaticity, and hue values of skin tone in the images 1920; store lightness, chromaticity, and hue values for the images in a data structure 1925 (such as an array or linked list.) This data structure can reside in a tangible computer memory as a nontransitory file. The system may determine data for a plurality of skin color calibration panels. The skin color calibration panels may be color composed of the measured lightness, chromaticity, and hue associated with that identifier 1930. The system may determine data for a plurality of non-skin color calibration panels. The non-skin color calibration panels may be color composed of the measured lightness, chromaticity, and hue associated with that identifier 1940. The skin color calibration panels may have a lightness, chromaticity, and hue consistent with a lightness, chromaticity, and hue of human skin. The nonskin color calibration panels may not have a lightness, chromaticity, and hue consistent with a lightness, chromaticity, and hue of human skin. The computer may organize the skin color calibration panels and non-skin color calibration panels into a grid 1950 in memory of the computer. The computer may export the grid into a tangible format 1952 or digital format. The exported grid may take form of a colorchecker 1955. The colorchecker may be printed on a tangible surface such as paper or plastic. The computer may generate a color measuring tool 1956 configured to measure lightness, chromaticity, and hue values of the panels in the printed colorchecker or digital colorchecker so that the lightness, chromaticity, and hue values are known to the computer and/or system 1960.

The system may have a second camera 1965 configured to capture an image of the colorchecker in a room 1970. The room being the physical space where the image is captured. The room may have luminance and a capture position. The room may comprise a background having a color. The color of the background may be measured by the color measuring tool. The second camera may comprise a color calibration logic configured to generate a color corrected image. The system may comprise a user identification logic 1975. The user identification logic 1975 may perform image matching 1980 using the color corrected image against other stored images in a database 1982. The system may obtain user biographic data from the database by matching a stored image in the database with the color corrected image 1984. The system may send a message or signal to an access control device 1990. An access control device 2000 may be a physical barrier, locking mechanism, electronic door, or electronic gate.

Figure 20:
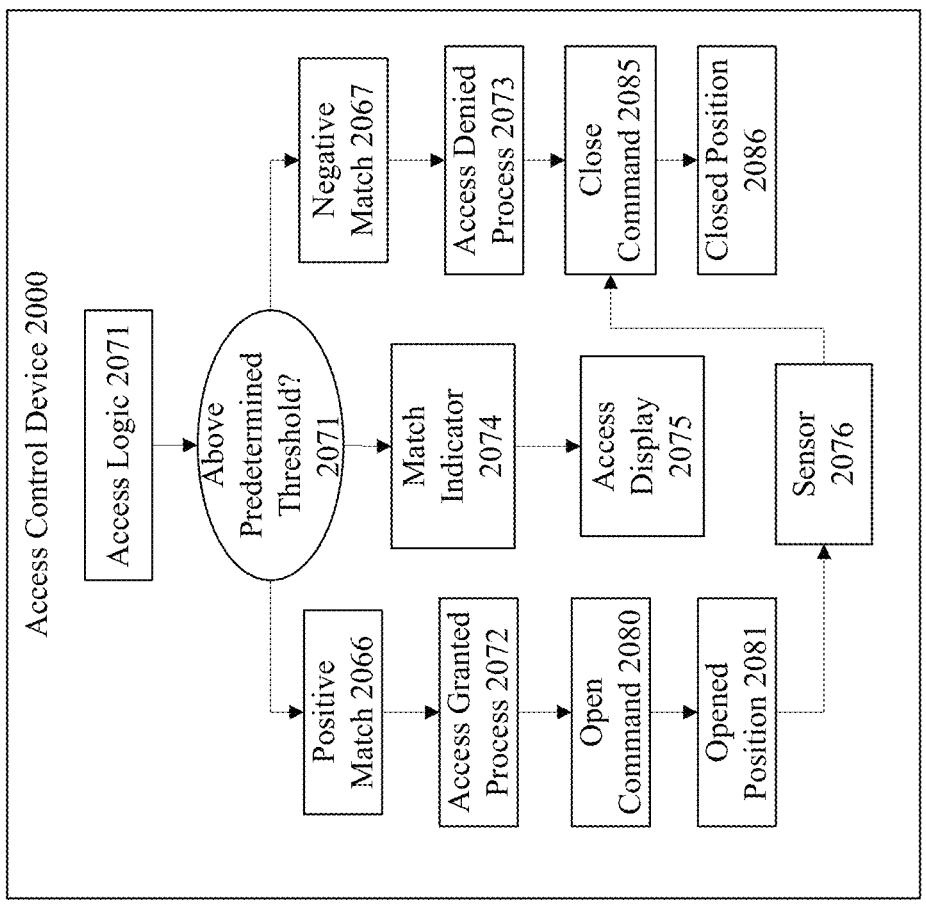
FIG. 20 shows an example of an access control device.

FIG. 20 shows an example of an access control device 2000. The access control device can be an electromechanical device configured to restrict or block movement of a person through or into a restricted area. It could be an electronic lock for a hatch. It can be a turn-style. The access control device can be configured to provide an operator with a message to permit or deny access to a user. The access control device 2000 can include biometric matching technology, e.g., a fingerprint scanner, or a facial image capture device, etc. As shown in FIG. 20, the user identification logic 1975 may be configured to transmit a message 2065 to the access control device 2100. In other configurations, the computer or other component in the system might transmit the message access control device. In other configurations, the kiosk and the access control device 2000 might be an integrated unit. The access control device 2000 may comprise access logic configured to determine whether the matching comparison is above a predetermined threshold. The access control device may be programmed to execute an access granted process 2072 if matching comparison is above the predetermined threshold. The access control device may be programmed to execute an access denied process 2073 if matching comparison is below the predetermined threshold. In other configurations, the message 2065 may indicate a positive match based on the matching comparison 2062. The access control device 2000 may be programmed to execute the access granted process 2072 if the message indicates a positive match 2066 based on the matching comparison 2062. The access control device 2000 may be programmed to execute an access denied process 2073 if the message indicates negative match 2067 based on the matching comparison 2062. The access control device may comprise an access display 2075 configured to display a match indicator 2074 based on a result from the matching comparison 2062. The match indicator 2074 may be configured to indicate a positive match 2066 if the matching comparison exceeds a predetermined threshold 2071. The match indicator 2074 configured to indicate a negative match 2067 if the matching comparison 2062 does not exceed a predetermined threshold. The access display 2075 may be configured to display the match indicator 2074 to the user or an operator. The access control device 2000 may generate an open command 2080 configured to cause the access control device to shift from a closed position 2086 into an opened position 2081. In the closed position 2086, the access control device 2000 may restrict or block access of a user to a restricted area. In the closed position 2086, the access control device may restrict or block a user from exiting a certain area. In the closed position, the access control device may restrict or block a user from access a secure container. In the closed position, the access control device may lock or seal a door, gate, or hatch. In other configurations, the message 2065 itself may comprise an open command configured to cause the access control device to shift from the closed position into the opened position. The access control device may comprise a sensor 2076 configured to determine whether the user has passed through or within a predetermined radius of the access control device. The access control device may be configured to shift from the opened position 2081 into the closed position 2086 after receiving a message 2065 from the sensor 2076 that the user has passed or within a predetermined radius of the access control device.

The calibration logic may comprise a color calibration logic configured to adjust lightness, chromaticity, and hue of the image captured by the camera of the colorchecker matches the known colorchecker lightness, chromaticity, and hue values within a tolerance; and save the image as a color corrected image.

The calibration logic may comprise a camera calibration logic configured: to adjust focus, white balance, ISO, and shutter speed of the camera so that the lightness, chromaticity, and hue of an image captured by the camera of the colorchecker matches the known colorchecker lightness, chromaticity, and hue values within a tolerance; and save the image as a color corrected image.

The calibration logic may comprise environmental calibration logic configured to: adjust ambient lighting and direct lighting in the room so that the lightness, chromaticity, and hue of an image captured by the camera of the colorchecker; match the known colorchecker lightness, chromaticity, and hue values within a tolerance; and save the image as a color corrected image.

The calibration logic may comprise camera position logic configured: to adjust positioning of the camera relative to the user so that the lightness, chromaticity, and hue of an image captured by the camera of the colorchecker; match the known colorchecker lightness, chromaticity, and hue values within a tolerance; and save the image as a color corrected image.

The calibration logic may comprise camera health logic configured to determine whether camera parameters are within normal operating parameters; normal operating parameters including a charged or functioning power supply and a camera lens substantially free of debris. The camera health logic may be able sense an amount of power in a battery. The camera health logic may comprise a lens clarity tool. The lens clarity tool may be capable of determining whether the lens of the camera has any scratches or debris on the tool. The lens clarity may be to provide the camera health logic with a clarity value depending on how much of the surface of the lens is covered with scratches or debris.

The computer is configured to export the grid as a digital colorchecker; export the grid by printing the grid as a printed colorchecker; or export the grid by printing the grid as a three-dimensional printed colorchecker. In some configurations the computer is connected to a regular printer (like a laserjer or inkjet). The computer may also be connected to a 3D printer.

The second camera of the system may comprise skin detection logic configured to determine a portion of the image corresponding to skin of the target user; and skin match logic configured to determine whether the target user's skin matches lightness, chromaticity, and hue of a skin color calibration panel in the grid.

Figure 21:
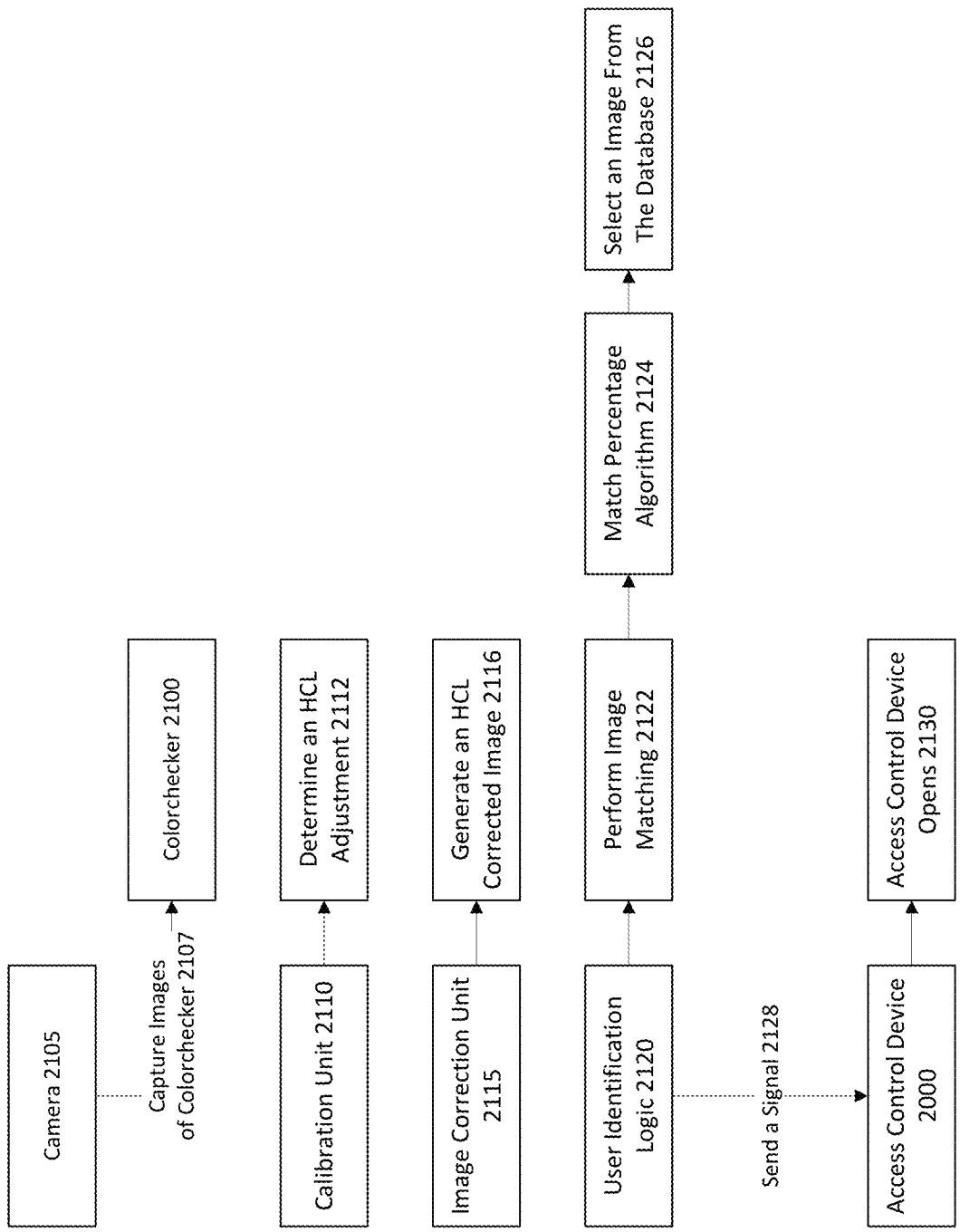
FIG. 21 shows a system for identifying a target user.

FIG. 21 shows a system for identifying a target user is disclosed. The system may comprise a colorchecker 2100 comprising panels containing colors matching human skin phenotype; the panels comprising known values of hue, chromaticity, and lightness (HCL). The system may comprise a camera 2105 configured to capture 207 an image of the colorchecker. The system may comprise a calibration unit 2110 configured to determine an HCL adjustment 2112 required to adjust the image from a camera so that HCL of the panels matches the known values. The camera may be configured to take an image of the target user. The system may comprise an image correction unit 2115 configured to generate an HCL corrected image 2116 by adjusting the image of the target user by applying the HCL adjustment to the image of the target user. The system may comprise user identification logic 2120. The user identification may be configured to: perform image matching 2122 using the HCL corrected image against other stored images in a database; execute a match percentage algorithm 2124 configured to compute a match score; select an image from the database 2126 based on the match score if the match score is above a preset threshold; and send a signal 2128 to an access control device 2000. The access control device shifting from a closed/locked position to an open/unlocked position upon receipt of the signal 2130. The images in the databases are HCL corrected images. The match score may indicate how closely the image in the database matched the HCL corrected image of the target user. The access control device may be configured grant access to the target user to a restricted location, restricted privileges, restricted files, or a restricted item. The user identification logic may be further configured to select an image from the database having a highest match score relative to all other images in the database. The user identification logic may comprise a secondary confirmation logic configured to request the target user provide a passcode; and a passcode verification logic configured to verify that the passcode of the target user matches a presaved passcode for the target user.

Computer System

The computer and/or camera may comprise standard and specialized computer parts.

The computer and camera may comprise memory is specificized instructions designed to carry out aspects of the invention. Standard computer parts may include components like a hardware processor communicatively coupled to an instruction memory and to a data memory. The instruction memory can be configured to store, on at least a non-transitory computer-readable storage medium as described in greater detail below, executable program code. The hardware processor may include multiple hardware processors and/or multiple processor cores. The hardware processor may include hardware processors from different devices, that cooperate. The computer system system may execute one or more basic instructions included in the memory executable program code in instruction memory.

Relationship Between Hardware Processor and Executable Program Code

The relationship between the executable program code in the instruction memory and the hardware processor is structural; the executable program code is provided to the hardware processor by imparting various voltages at certain times across certain electrical connections, in accordance with binary values in the executable program code, to cause the hardware processor to perform some action, as now explained in more detail. The executable program code in the instruction memory can include an EM Scanner Interface Logic, a Raw EM Scanning Artificial Neural Network Library, a Raw EM Scanning Training Logic, a Raw EM Scan Trained ANN Classifier logic, a Visible Spectra Image Improvement Logic, and Raw EM Scanning Classifier.

A hardware processor may be thought of as a complex electrical circuit that is configured to perform a predefined set of basic operations in response to receiving a corresponding basic instruction selected from a predefined native instruction set of codes.

The predefined native instruction set of codes is specific to the hardware processor; the design of the processor defines the collection of basic instructions to which the processor will respond, and this collection forms the predefined native instruction set of codes.

A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor.

Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

Computer Program Product

A computer program product is an article of manufacture that has a computer-readable medium with executable program code that is adapted to enable a processing system to perform various operations and actions. Stated differently, the executable program code can embody or functionality of instructions that cause a computer, e.g., that cause the processor, to perform particular operations or processes.

A computer-readable medium may be transitory or non-transitory.

A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

Conclusion

For any computer-implemented embodiment, "means plus function" elements will use the term "means;" the terms "logic" and "module" have the meaning ascribed to them above and are not to be construed as generic means. An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation. The indication of any elements or steps as "optional" does not indicate that all other or any other elements or steps are mandatory. The claims define the invention and form part of the specification. Limitations from the written description are not to be read into the claims.

Certain attributes, functions, steps of methods, or sub-steps of methods described herein may be associated with physical structures or components, such as a module of a physical device that, in implementations in accordance with this disclosure, make use of instructions (e.g., computer executable instructions) that may be embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

What is claimed is:

1. A system for identifying a target user comprising:
  a camera for capturing images of a plurality of users; the camera configured to assign an identifier to each image creating an association between a user and an image;
  a computer configured to:
    measuring lightness, chromaticity, and hue values of skin tone in the images;
    store lightness, chromaticity, and hue values for the images in a data structure;
    determine data for a plurality of skin color calibration panels, the skin color calibration panels composed of the measured lightness, chromaticity, and hue associated with that identifier;
    determine data for a plurality of non-skin color calibration panels, the non-skin color calibration panels composed of the measured lightness, chromaticity, and hue associated with that identifier;
    the skin color calibration panels having a lightness, chromaticity, and hue consistent with a lightness, chromaticity, and hue of human skin;
    the non-skin color calibration panels not having a lightness, chromaticity, and hue consistent with a lightness, chromaticity, and hue of human skin;
    organize the skin color calibration panels and non-skin color calibration panels into a grid;

export the grid into a tangible format; the tangible format comprising a printed colorchecker;
a color measuring tool configured to measure lightness, chromaticity, and hue values of the panels in the printed colorchecker so that the lightness, chromaticity, and hue values are known to the system;
a second camera configured to capture an image of the colorchecker in a room; the room having a luminance and a capture position;
the second camera comprising a color calibration logic configured to generate a color corrected image;
a user identification logic configured to:
  perform image matching using the color corrected image against other stored images in a database;
  obtain user biographic data from the database by matching a stored image in the database with the color corrected image;
  send a signal to an access control device;
the access control device configured to grant access to the target user to a restricted location, restricted privileges, restricted files, or a restricted item.

2. The system of claim 1, wherein the calibration logic comprises a color calibration logic configured to:
  adjust lightness, chromaticity, and hue of the image captured by the camera of the colorchecker;
  match the colorchecker lightness, chromaticity, and hue values within a tolerance; and
  save the image as a color corrected image.

3. The system of claim 1, wherein the calibration logic comprises a camera calibration logic configured to:
  adjust focus, white balance, ISO, and shutter speed of the camera so that the lightness, chromaticity, and hue of an image captured by the camera of the colorchecker;
  match the colorchecker lightness, chromaticity, and hue values within a tolerance; and
  save the image as a color corrected image.

4. The system of claim 1, herein the calibration logic comprises environmental calibration logic configured to:
  adjust ambient lighting and direct lighting in the room so that the lightness, chromaticity, and hue of an image captured by the camera of the colorchecker;
  match the colorchecker lightness, chromaticity, and hue values within a tolerance; and
  save the image as a color corrected image.

5. The system of claim 1 wherein the calibration logic comprises camera position logic configured to:
  adjust positioning of the camera relative to the user so that the lightness, chromaticity, and hue of an image captured by the camera of the colorchecker;
  match the colorchecker lightness, chromaticity, and hue values within a tolerance; and
  save the image as a color corrected image.

6. The system of claim 1 wherein the calibration logic comprises camera health logic configured to determine whether camera parameters are within normal operating parameters; normal operating parameters including a charged or functioning power supply and a camera lens substantially free of debris.

7. The system of claim 1 wherein the computer is configured to export the grid as a digital colorchecker.

8. The system of claim 1 wherein the computer is configured to export the grid by printing the grid as a printed colorchecker.

9. The system of claim 1 wherein the computer is configured to export the grid by printing the grid as a three-dimensional printed colorchecker.

10. The system of claim 1 wherein the second camera comprises:
  skin detection logic configured to determine a portion of the image corresponding to skin of the target user; and
  skin match logic configured to determine whether a target user's skin matches lightness, chromaticity, and hue of a skin color calibration panel in the grid.

11. A system for determining a skin tone of a target user comprising:
  a camera for capturing images of a plurality of users; the image comprising an identifier;
  a computer configured to:
    measure lightness, chromaticity, and hue values of skin tone in the images;
    store the measured lightness, chromaticity, and hue values for the images in a data structure;
    determine data for a plurality of skin color calibration panels, the skin color calibration panels color composed of the measured lightness, chromaticity, and hue associated with that identifier;
    determine data for a plurality of non-skin color calibration panels, the non-skin color calibration panels color composed of the measured lightness, chromaticity, and hue associated with that identifier;
    the skin color calibration panels having a lightness, chromaticity, and hue consistent with a lightness, chromaticity, and hue of human skin;
    the non-skin color calibration panels not having a lightness, chromaticity, and hue consistent with a lightness, chromaticity, and hue of human skin;
    organize the skin color calibration panels and non-skin color calibration panels into a grid;
    export the grid into a tangible format; the tangible format comprising a printed colorchecker;
    measure lightness, chromaticity, and hue values of the panels in the printed colorchecker or digital colorchecker so that the lightness, chromaticity, and hue values are known to the system;
  a second camera configured to capture a picture of the colorchecker in a room; the room having luminance and a capture position;
  the second camera comprising a color calibration logic configured to generate a color corrected image;
  a user identification logic configured to:
    perform image matching using the color corrected image against other storages images in database;
    obtain user biographic data from the database by matching a stored image in the database with the color corrected image;
    send a signal to an access control device;
  the access control device configured to grant access to the target user to a restricted location, restricted privileges, restricted files, or a restricted item.

12. The system of claim 11 wherein the calibration logic comprises a color calibration logic configured to:
  adjust lightness, chromaticity, and hue of the image captured by the camera of the colorchecker;
  match the colorchecker lightness, chromaticity, and hue values within a tolerance; and
  save the image as a color corrected image.

13. The system of claim 11 wherein the calibration logic comprises a camera calibration logic configured to:
  adjust focus, white balance, ISO, and shutter speed of the camera so that the lightness, chromaticity, and hue of an image captured by the camera of the colorchecker;

match the colorchecker lightness, chromaticity, and hue values within a tolerance; and save the image as a color corrected image.

14. The system of claim 11 wherein the calibration logic comprises environmental calibration logic configured to:

adjust ambient lighting and direct lighting in the room so that the lightness, chromaticity, and hue of an image captured by the camera of the colorchecker;

match the colorchecker lightness, chromaticity, and hue values within a tolerance; and save the image as a color corrected image.

15. The system of claim 11 wherein the calibration logic comprises camera position logic configured to:

adjust positioning of the camera relative to the user so that the lightness, chromaticity, and hue of an image captured by the camera of the colorchecker;

match the colorchecker lightness, chromaticity, and hue values within a tolerance; and save the image as a color corrected image.

16. The system of claim 11 wherein the calibration logic comprises camera health logic configured to determine whether camera parameters are within normal operating parameters; normal operating parameters including a charged or functioning power supply and a camera lens substantially free of debris.

17. The system of claim 11 wherein the computer is configured to export the grid as a digital colorchecker.

18. The system of claim 11 wherein the computer is configured to export the grid by printing the grid as a printed colorchecker.

19. The system of claim 11 wherein the computer is configured to export the grid by printing the grid as a three-dimensional printed colorchecker.

20. The system of claim 11 wherein the second camera comprises:

skin detection logic configured to determine a portion of the image corresponding to skin of the target user; and skin match logic configured to determine whether a target user's skin matches lightness, chromaticity, and hue of a skin color calibration panel in the grid.

* * * * *

UNITED STATES PATENT AND TRADEMARK OFFICE
CERTIFICATE OF CORRECTION

| | | |
|---|---|---|
| PATENT NO. | : 12,067,750 B2 | Page 1 of 1 |
| APPLICATION NO. | : 18/381840 | |
| DATED | : August 20, 2024 | |
| INVENTOR(S) | : Arun Vemury et al. | |

It is certified that error appears in the above-identified patent and that said Letters Patent is hereby corrected as shown below:

In the Drawings

Sheet 37, Fig. 18, element 1885. Replace the text "No, set color health value of the face equal to 1. 1885" with the following text --No, set color health value of the face proportional to the shortest difference in CIELAB space to the boundary of the natural color range. 1885--

In the Specification

Column 21, Line 56, add a --,-- after the phrase "If HCL values are outside the normal range"; replace the word "setting" with the phrase --the computer may set--

Signed and Sealed this
First Day of October, 2024

Katherine Kelly Vidal
*Director of the United States Patent and Trademark Office*